United States Patent
Gomi

(10) Patent No.: US 10,602,088 B2
(45) Date of Patent: Mar. 24, 2020

(54) SOLID-STATE IMAGING DEVICE AND IMAGING APPARATUS

(71) Applicant: OLYMPUS CORPORATION, Hachioji-shi, Tokyo (JP)

(72) Inventor: Yuichi Gomi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 17 days.

(21) Appl. No.: 15/945,053

(22) Filed: Apr. 4, 2018

(65) Prior Publication Data
US 2018/0227530 A1 Aug. 9, 2018

Related U.S. Application Data

(63) Continuation of application No. PCT/JP2015/082621, filed on Nov. 19, 2015.

(51) Int. Cl.
*H04N 5/3745* (2011.01)
*H04N 9/04* (2006.01)
*H04N 5/341* (2011.01)
*H04N 5/357* (2011.01)

(52) U.S. Cl.
CPC ......... *H04N 5/37452* (2013.01); *H04N 5/341* (2013.01); *H04N 5/3577* (2013.01); *H04N 5/3745* (2013.01); *H04N 9/045* (2013.01)

(58) Field of Classification Search
CPC ...... H04N 5/3745; H04N 5/341; H04N 9/045; H04N 5/37452
See application file for complete search history.

(56) References Cited

U.S. PATENT DOCUMENTS

| | | | |
|---|---|---|---|
| 2003/0010896 A1 | 1/2003 | Kaifu et al. | |
| 2007/0013798 A1* | 1/2007 | Ahn | H04N 5/335 348/308 |
| 2012/0050592 A1 | 3/2012 | Oguma | |

FOREIGN PATENT DOCUMENTS

| | | |
|---|---|---|
| JP | 2000-4406 A | 1/2000 |
| JP | 2003-9003 A | 1/2003 |
| JP | 2008-546313 A | 12/2008 |
| JP | 2012-54755 A | 3/2012 |

(Continued)

OTHER PUBLICATIONS

International Search Report dated Jan. 19, 2016, issued in counterpart International Application No. PCT/JP2015/082621, w/English translation (4 pages).

*Primary Examiner* — Ahmed A Berhan
(74) *Attorney, Agent, or Firm* — Westerman, Hattori, Daniels & Adrian, LLP

(57) ABSTRACT

A solid-state imaging device includes a plurality of pixels and a pixel control circuit. The pixel control circuit is configured to control the signal transfer circuit so that an imaging operation is performed simultaneously in the plurality of pixel group units and a plurality of imaging operations are performed in each of the plurality of pixel group units. In each of the plurality of imaging operations, an imaging signal output from at least one of two or more photoelectric conversion elements included in each of the plurality of pixel group units is transferred to one of two or more memories included in each of the plurality of pixel group units. Each of the two or more memories included in each of the plurality of pixel group units holds the imaging signal in a predetermined order.

8 Claims, 13 Drawing Sheets

(56) References Cited

FOREIGN PATENT DOCUMENTS

| | | |
|---|---|---|
| JP | 2013-9301 A | 1/2013 |
| JP | 2015-111761 A | 6/2015 |
| WO | 2006/130518 A1 | 12/2006 |

* cited by examiner

SOLID-STATE IMAGING DEVICE AND IMAGING APPARATUS

This application is a continuation application based on International Patent Application No. PCT/JP2015/082621 filed on Nov. 19, 2015, the content of which is incorporated herein by reference.

BACKGROUND OF THE INVENTION

Field of the Invention

The present invention relates to a solid-state imaging device and an imaging apparatus.

Description of Related Art

A method of thinning out pixels is known as a high-speed imaging method using a solid-state imaging device. In a solid-state imaging device disclosed in Japanese Unexamined Patent Application, First Publication No. 2000-4406, pixels can be thinned out in a row direction and a column direction. By thinning out the pixels, the number of pixels from which an imaging signal is read is reduced. Therefore, the solid-state imaging device can perform imaging at a high speed.

SUMMARY OF THE INVENTION

According to a first aspect of the present invention, a solid-state imaging device includes a plurality of pixels and a pixel control circuit. Each of the plurality of pixels includes a photoelectric conversion element, a memory, a signal transfer circuit, and a signal output circuit. The photoelectric conversion element is configured to perform imaging and output an imaging signal. The memory is configured to hold the imaging signal. The signal transfer circuit is configured to transfer the imaging signal output from the photoelectric conversion element to the memory. The signal output circuit is configured to output the imaging signal held in the memory to a signal line. Each of the plurality of pixels is included in any one of a plurality of pixel group units. Each of the plurality of pixel group units includes two or more of the pixels. The pixel control circuit is configured to control the signal transfer circuit so that an imaging operation is performed simultaneously in the plurality of pixel group units and a plurality of imaging operations are performed in each of the plurality of pixel group units. The imaging signal output from at least one of the two or more photoelectric conversion elements included in each of the plurality of pixel group units is transferred to one of the two or more memories included in each of the plurality of pixel group units in each of the plurality of imaging operations. Each of the two or more memories included in each of the plurality of pixel group units are configured to hold the imaging signals in a predetermined order. At least one of the imaging signals held in the memory in each of the plurality of imaging operations is output to the signal line in a period in which any one of the plurality of imaging operations is performed or in a period after the plurality of imaging operations have ended.

According to a second aspect of the present invention, in the first aspect, the pixel control circuit may further be configured to control the number of the pixels included in each of the plurality of pixel group units.

According to a third aspect of the present invention, in the first aspect, a signal obtained by adding the imaging signals output from all of the photoelectric conversion elements included in each of the plurality of pixel group units may be transferred to one of the two or more memories included in each of the plurality of pixel group units in each of the plurality of imaging operations.

According to a fourth aspect of the present invention, in the first aspect, each of the plurality of pixel group units may include two or more pixels corresponding to a first color and two or more pixels corresponding to a second color. The first color and the second color are different from each other. A signal obtained by adding the imaging signals output from the photoelectric conversion elements included in each of the plurality of pixel group units and corresponding to the same color may be transferred to one of two or more memories included in each of the plurality of pixel group units in each of the plurality of imaging operations.

According to a fifth aspect of the present invention, in the first aspect, the solid-state imaging device may further include a mode control circuit configured to set one of a first mode and a second mode in the pixel control circuit. When the first mode is set, a signal obtained by adding the imaging signals output from all of the photoelectric conversion elements included in each of the plurality of pixel group units may be transferred to one of the two or more memories included in each of the plurality of pixel group units in each of the plurality of imaging operations. When the second mode is set, each of the plurality of pixel group units may include two or more pixels corresponding to a first color and two or more pixels corresponding to a second color. The first color and the second color are different from each other. When the second mode is set, a signal obtained by adding the imaging signals output from the photoelectric conversion elements included in each of the plurality of pixel group units and corresponding to the same color may be transferred to one of two or more memories included in each of the plurality of pixel group units in each of the plurality of imaging operations.

According to a sixth aspect of the present invention, in the third aspect, the photoelectric conversion element may be configured to output charge as the imaging signal. The signal transfer circuit may include a floating diffusion, a transfer transistor, a memory output circuit, and a first connection transistor. The floating diffusion may be configured to hold a voltage based on the charge output from the photoelectric conversion element. The transfer transistor may be configured to transfer the charge output from the photoelectric conversion element to the floating diffusion. The memory output circuit may be configured to output the imaging signal based on the voltage held in the floating diffusion to the memory. The first connection transistor may be connected to the memory output circuit and the memory. The first connection transistor may be configured to switch between a state in which the memory output circuit and the memory are electrically connected to each other and a state in which the memory output circuit and the memory are electrically isolated from each other. The solid-state imaging device may further include a second connection transistor. The second connection transistor may be connected to two or more floating diffusions included in each of the plurality of pixel group units. The second connection transistor may be configured to switch between a state in which the two or more floating diffusions are electrically connected to each other and a state in which the two or more floating diffusions are electrically isolated from each other. The pixel control circuit may be configured to electrically connect the memory output circuit and the memory to each other using the first connection transistor, and electrically connect the two or more floating diffusions using the second connection transistor when the imaging signals output from the photoelectric conversion elements are added. The pixel control circuit may be configured to transfer the charge output from the photoelectric conversion element to the floating diffusion using the transfer transistor after the memory output circuit and the memory are electrically connected to each other and the two or more floating diffusions are electrically connected to each other.

According to a seventh aspect of the present invention, in the fourth aspect, the photoelectric conversion element may be configured to output charge as the imaging signal. The signal transfer circuit may include a floating diffusion, a transfer transistor, a memory output circuit, and a first connection transistor. The floating diffusion may be configured to hold a voltage based on the charge output from the photoelectric conversion element. The transfer transistor may be configured to transfer the charge output from the photoelectric conversion element to the floating diffusion. The memory output circuit may be configured to output the imaging signal based on the voltage held in the floating diffusion to the memory. The first connection transistor may be connected to the memory output circuit and the memory. The first connection transistor may be configured to switch between a state in which the memory output circuit and the memory are electrically connected to each other and a state in which the memory output circuit and the memory are electrically isolated from each other. The solid-state imaging device may further include a second connection transistor. The second connection transistor may be connected to two or more floating diffusions included in each of the plurality of pixel group units. The second connection transistor may be configured to switch between a state in which the two or more floating diffusions are electrically connected to each other and a state in which the two or more floating diffusions are electrically isolated from each other. The pixel control circuit may be configured to electrically connect the memory output circuit and the memory to each other using the first connection transistor, and electrically connect the two or more floating diffusions using the second connection transistor when the imaging signals output from the photoelectric conversion elements are added. The pixel control circuit may be configured to transfer the charge output from the photoelectric conversion element to the floating diffusion using the transfer transistor after the memory output circuit and the memory are electrically connected to each other and the two or more floating diffusions are electrically connected to each other.

According to an eighth aspect of the present invention, in the third aspect, the photoelectric conversion element may be configured to output charge as the imaging signal. The signal transfer circuit may include a floating diffusion, a transfer transistor, a memory output circuit, and a first connection transistor. The floating diffusion may be configured to hold a voltage based on the charge output from the photoelectric conversion element. The transfer transistor may be configured to transfer the charge output from the photoelectric conversion element to the floating diffusion. The memory output circuit may be configured to output the imaging signal based on the voltage held in the floating diffusion to the memory. The first connection transistor may be connected to the memory output circuit and the memory. The first connection transistor may be configured to switch between a state in which the memory output circuit and the memory are electrically connected to each other and a state in which the memory output circuit and the memory are electrically isolated from each other. The solid-state imaging device may further include a second connection transistor. The second connection transistor may be connected to two or more floating diffusions included in each of the plurality of pixel group units. The second connection transistor may be configured to switch between a state in which the two or more floating diffusions are electrically connected to each other and a state in which the two or more floating diffusions are electrically isolated from each other. The pixel control circuit may be configured to electrically connect the memory output circuit and the memory to each other using the first connection transistor when the imaging signals output from the photoelectric conversion elements are added. The pixel control circuit may be configured to transfer the charge output from the photoelectric conversion element to the floating diffusion using the transfer transistor after the memory output circuit and the memory are electrically connected to each other. The pixel control circuit may be configured to electrically connect the two or more floating diffusions using the second connection transistor after the charge output from the photoelectric conversion element is transferred to the floating diffusion.

According to a ninth aspect of the present invention, in the fourth aspect, the photoelectric conversion element may be configured to output charge as the imaging signal. The signal transfer circuit may include a floating diffusion, a transfer transistor, a memory output circuit, and a first connection transistor. The floating diffusion may be configured to hold a voltage based on the charge output from the photoelectric conversion element. The transfer transistor may be configured to transfer the charge output from the photoelectric conversion element to the floating diffusion. The memory output circuit may be configured to output the imaging signal based on the voltage held in the floating diffusion to the memory. The first connection transistor may be connected to the memory output circuit and the memory. The first connection transistor may be configured to switch between a state in which the memory output circuit and the memory are electrically connected to each other and a state in which the memory output circuit and the memory are electrically isolated from each other. The solid-state imaging device may further include a second connection transistor. The second connection transistor may be connected to two or more floating diffusions included in each of the plurality of pixel group units. The second connection transistor may be configured to switch between a state in which the two or more floating diffusions are electrically connected to each other and a state in which the two or more floating diffusions are electrically isolated from each other. The pixel control circuit may be configured to electrically connect the memory output circuit and the memory to each other using the first connection transistor when the imaging signals output from the photoelectric conversion elements are added. The pixel control circuit may be configured to transfer the charge output from the photoelectric conversion element to the floating diffusion using the transfer transistor after the memory output circuit and the memory are electrically connected to each other. The pixel control circuit may be configured to electrically connect the two or more floating diffusions using the second connection transistor after the charge output from the photoelectric conversion element is transferred to the floating diffusion.

According to a tenth aspect of the present invention, in any one of the first to seventh aspects, the solid-state imaging device may further include a first substrate and a second substrate. The photoelectric conversion element may be arranged on the first substrate. The memory may be arranged on the second substrate.

According to an eleventh aspect of the present invention, in any one of the first to eighth aspects, an imaging apparatus includes the solid-state imaging device.

DETAILED DESCRIPTION OF THE INVENTION

Embodiments of the present invention will be described with reference to the drawings.

First Embodiment

Figure 1:
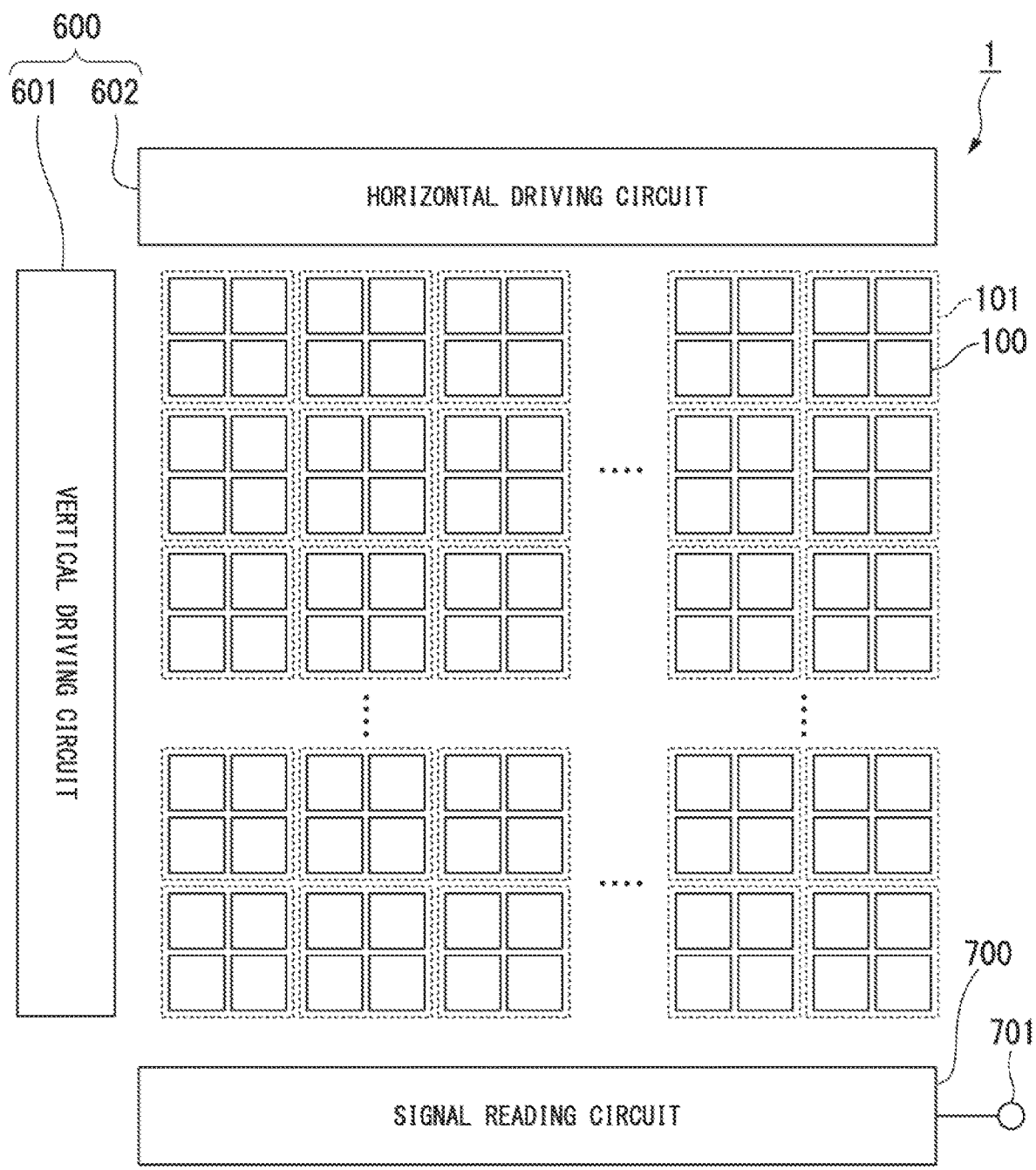
FIG. 1 is a block diagram showing a configuration of a solid-state imaging device according to a first embodiment of the present invention.

FIG. 1 shows a configuration of a solid-state imaging device 1 according to a first embodiment of the present invention. As shown in FIG. 1, the solid-state imaging device 1 includes a plurality of pixels 100, a pixel control circuit 600, and a signal reading circuit 700.

In FIG. 1, a reference numeral of one pixel 100 is indicated as a representative. In FIG. 1, some of the plurality of pixels 100 are omitted. The plurality of pixels 100 are arranged in a matrix form. The number of pixels in a row direction and a column direction may be 2 or more. Each of the plurality of pixels 100 is included in any one of the plurality of pixel group units 101. In FIG. 1, a reference numeral of one pixel group unit 101 is indicated as a representative. Each of the plurality of pixel group units 101 includes two or more pixels 100. The number of pixels 100 included in each of the plurality of pixel group units 101 is the same. The pixels 100 included in each of the plurality of pixel group units 101 are continuous in at least one of the row direction and the column direction. The pixel group unit 101 shown in FIG. 1 includes four pixels 100. The number of pixels in the row direction and the column direction in one pixel group unit 101 is two. A plurality of pixel group units 101 are regularly and periodically arranged in the row direction and the column direction. The number of the pixels 100 included in one pixel group unit 101 need not be four.

The pixel control circuit 600 controls the plurality of pixels 100. The pixel control circuit 600 controls the plurality of pixels 100 so that imaging operations are simultaneously performed in the plurality of pixel group units 101. By this control, a global shutter function is realized. The pixel control circuit 600 controls the plurality of pixels 100 such that a plurality of imaging operations are performed in each of the plurality of pixel group units 101. By this control, the solid-state imaging device 1 continuously performs imaging of a plurality of frames.

The pixel control circuit 600 includes a vertical driving circuit 601 and a horizontal driving circuit 602. The vertical driving circuit 601 controls the plurality of pixels 100 for each row in an array of the plurality of pixels 100. The vertical driving circuit 601 generates a control signal for performing this control and outputs the control signal to the plurality of pixels 100. The vertical driving circuit 601 and the horizontal driving circuit 602 control a connection of two or more pixels 100. The vertical driving circuit 601 and the horizontal driving circuit 602 generate a control signal for performing this control and output the control signal to the plurality of pixel group units 101.

The signal reading circuit 700 performs signal processing and column selection. The signal reading circuit 700 performs signal processing on an imaging signal output from the plurality of pixels 100. For example, signal processing is an amplification process. The signal reading circuit 700 selects the imaging signals output from the pixels 100 in each row in the army of the plurality of pixels 100, for each column in the array of the plurality of pixels 100, and sequentially outputs the selected imaging signals in a horizontal direction. The imaging signal output from the signal reading circuit 700 is output from the output terminal 701 to the outside of the solid-state imaging device 1.

In FIG. 1, signal lines connecting each of the vertical driving circuit 601, the horizontal driving circuit 602, and the signal reading circuit 700 to the plurality of pixel group units 101 are omitted.

Figure 2:
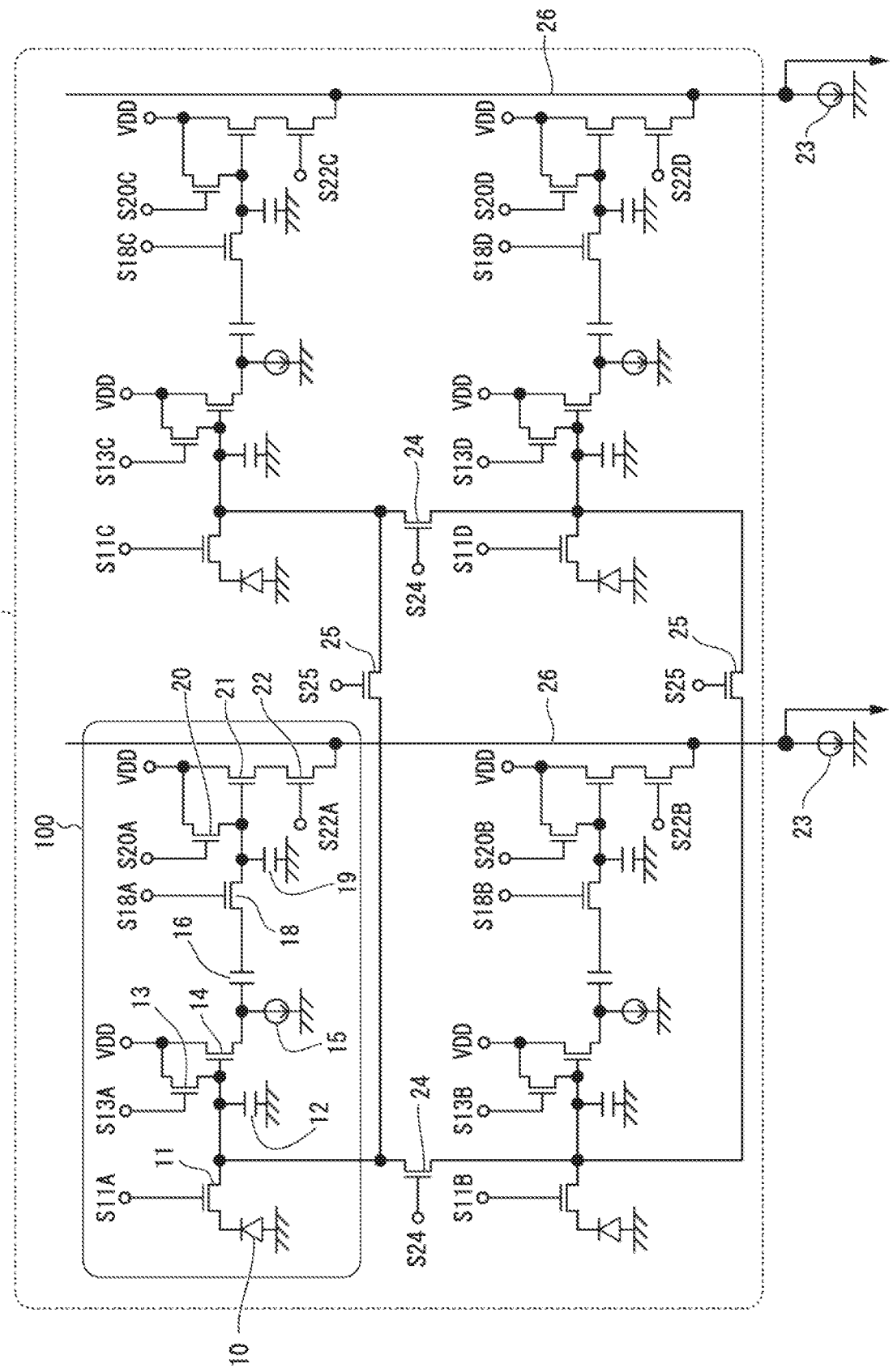
FIG. 2 is a circuit diagram of a pixel group unit in the solid-state imaging device according to the first embodiment of the present invention.

FIG. 2 shows a configuration of the pixel group unit 101. One pixel group unit 101 includes four pixels 100. In FIG. 2, the reference numeral of one pixel 100 is indicated as a representative. For only one pixel 100, reference numerals of elements constituting the pixel 100 are shown.

One pixel group unit 101 includes, as the four pixels 100, a first pixel, a second pixel, a third pixel, and a fourth pixel. The first pixel and the second pixel are adjacent to each other in the column direction. The third pixel and the fourth pixel are adjacent to each other in the column direction. The first pixel and the third pixel are adjacent in the row direction. The second pixel and the fourth pixel are adjacent in the row direction.

The first pixel includes a photoelectric conversion element 10, a transfer transistor 11, a floating diffusion 12, a reset transistor 13, a first amplification transistor 14, a first current source 15, a clamp capacitor 16, a sample-and-hold transistor 18 (a first connection transistor), a memory 19, a clamp transistor 20, a second amplification transistor 21, and a selection transistor 22. Hereinafter, the floating diffusion 12 is described as an FD 12.

A first end of the photoelectric conversion element 10 is connected to a ground. A drain of the transfer transistor 11 is connected to a second end of the photoelectric conversion element 10. A gate of the transfer transistor 11 is connected to the vertical driving circuit 601. A control signal S11A is supplied from the vertical driving circuit 601 to the gate of the transfer transistor 11.

A first end of the FD 12 is connected to a source of the transfer transistor 11. A second end of the FD 12 is connected to the ground. A drain of the reset transistor 13 is connected to a power supply that supplies a power supply voltage VDD. A source of the reset transistor 13 is connected to a source of the transfer transistor 11. A gate of the reset transistor 13 is connected to the vertical driving circuit 601. The control signal S13A is supplied from the vertical driving circuit 601 to the gate of the reset transistor 13.

A drain of the first amplification transistor 14 is connected to the power supply that supplies the power supply voltage VDD. A gate of the first amplification transistor 14 is connected to the source of the transfer transistor 11. A first end of the first current source 15 is connected to a source of the first amplification transistor 14. A second end of the first current source 15 is connected to the ground. A first end of the clamp capacitor 16 is connected to the source of the first amplification transistor 14 and the first end of the first current source 15.

A drain of the sample-and-hold transistor 18 is connected to a second end of the clamp capacitor 16. A gate of the sample-and-hold transistor 18 is connected to the vertical driving circuit 601. A control signal S18A is supplied from the vertical driving circuit 601 to the gate of the sample-and-hold transistor 18. A drain of the clamp transistor 20 is connected to the power supply that supplies the power supply voltage VDD. A source of the clamp transistor 20 is connected to a source of the sample-and-hold transistor 18. A gate of the clamp transistor 20 is connected to the vertical driving circuit 601. A control signal S20A is supplied from the vertical driving circuit 601 to the gate of the clamp transistor 20.

A first end of the memory 19 is connected to the source of the sample-and-hold transistor 18. A second end of the memory 19 is connected to the ground. A drain of the second amplification transistor 21 is connected to the power supply that supplies the power supply voltage VDD. A gate of the second amplification transistor 21 is connected to a source of the sample-and-hold transistor 18. A drain of the selection transistor 22 is connected to a source of the second amplification transistor 21. A source of the selection transistor 22 is connected to a vertical signal line 26. A gate of the selection transistor 22 is connected to the vertical driving circuit 601. A control signal S22A is supplied from the vertical driving circuit 601 to the gate of the selection transistor 22.

The photoelectric conversion element 10 is a photodiode. The photoelectric conversion element 10 performs imaging and outputs an imaging signal. Specifically, the photoelectric conversion element 10 generates charge based on the amount of light incident on the photoelectric conversion element 10 and accumulates the generated charge. The photoelectric conversion element 10 outputs the charge as an imaging signal.

The transfer transistor 11 is connected to the photoelectric conversion element 10 and the FD 12. The transfer transistor 11 switches between a state in which the photoelectric conversion element 10 and the FD 12 are electrically connected to each other and a state in which the photoelectric conversion element 10 and the FD 12 are electrically isolated from each other. By turning on the transfer transistor 11, the photoelectric conversion element 10 and the FD 12 are electrically connected to each other. By turning off the transfer transistor 11, the photoelectric conversion element 10 and the FD 12 are electrically isolated from each other. When the photoelectric conversion element 10 and the FD 12 are electrically connected to each other, the transfer transistor 11 transfers the charge accumulated in the photoelectric conversion element 10 to the FD 12. ON and OFF of the transfer transistor 11 are controlled by the control signal S11A from the vertical driving circuit 601.

The FD 12 holds a voltage based on the charge output from the photoelectric conversion element 10. That is, the FD 12 holds the imaging signal output from the photoelectric conversion element 10 as a voltage.

The reset transistor 13 is connected to the power supply and the FD 12. The reset transistor 13 switches between a state in which the power supply and the FD 12 are electrically connected to each other and a state in which the power supply and the FD 12 are electrically isolated from each other. By turning on the reset transistor 13, the power supply and the FD 12 are electrically connected to each other. By turning off the reset transistor 13, the power supply and the FD 12 are electrically isolated from each other. When the power supply and the FD 12 are electrically connected to each other, the reset transistor 13 resets the FD 12. ON and OFF of the reset transistor 13 are controlled by the control signal S13A from the vertical driving circuit 601. When the transfer transistor 11 and the reset transistor 13 are ON, the photoelectric conversion element 10 is reset. By resetting the photoelectric conversion element 10 and the FD 12, the amount of charge accumulated in the photoelectric conversion element 10 and the FD 12 is controlled. By this reset, the state (potential) of the photoelectric conversion element 10 and the FD 12 is set to a reference state (a reference potential or a reset level).

The first amplification transistor 14 amplifies a voltage based on the charge held in the FD 12 and outputs the amplified voltage as an imaging signal from the source. The first current source 15 functions as a load of the first amplification transistor 14 and supplies a current for driving the first amplification transistor 14 to the first amplification transistor 14. The first amplification transistor 14 and the first current source 15 constitute a source follower circuit.

The clamp capacitor 16 clamps (fixes) a voltage level of the imaging signal output from the first amplification transistor 14. The sample-and-hold transistor 18 is connected to the clamp capacitor 16 and the memory 19. The sample-and-hold transistor 18 switches between a state in which the clamp capacitor 16 and the memory 19 are electrically connected to each other and a state in which the clamp capacitor 16 and the memory 19 are electrically isolated from each other. By turning on the sample-and-hold transistor 18, the clamp capacitor 16 and the memory 19 are electrically connected to each other. By turning off the sample-and-hold transistor 18, the clamp capacitor 16 and the memory 19 art electrically isolated from each other. When the clamp capacitor 16 and the memory 19 are electrically connected to each other, the sample-and-hold transistor 18 samples the voltage at the second end of the clamp capacitor 16. Accordingly, the sample-and-hold transistor 18 transfers the imaging signal output from the first amplification transistor 14 to the memory 19. ON and OFF of the sample-and-hold transistor 18 are controlled by the control signal S18A from the vertical driving circuit 601. The memory 19 holds the imaging signal sampled by the sample-and-hold transistor 18.

The transfer transistor 11, the FD 12, the first amplification transistor 14, the first current source 15, the clamp capacitor 16, and the sample-and-hold transistor 18 constitute a signal transfer circuit. The signal transfer circuit transfers the imaging signal output from the photoelectric conversion element 10 to the memory 19.

The first amplification transistor 14, the first current source 15, and the clamp capacitor 16 constitute a memory output circuit. The memory output circuit outputs the imaging signal based on the voltage held in the FD 12 to the memory 19. A connection between the memory output circuit and the memory 19 is controlled by the sample-and-hold transistor 18.

The clamp transistor 20 is connected to the power supply and the memory 19. The clamp transistor 20 switches between a state in which the power supply and the memory 19 are electrically connected to each other and a state in which the power supply and the memory 19 are electrically isolated from each other. When the clamp transistor 20 is turned ON, the power supply and the memory 19 are electrically connected to each other. By turning off the clamp transistor 20, the power supply and the memory 19 are electrically isolated from each other. When the power supply and the memory 19 are electrically connected to each other, the clamp transistor 20 resets the memory 19. ON and OFF of the clamp transistor 20 are controlled by the control signal S20A from the vertical driving circuit 601. When the sample-and-hold transistor 18 and the clamp transistor 20 are ON, the clamp capacitor 16 is reset. By resetting the clamp capacitor 16 and the memory 19, the amount of charge accumulated in the clamp capacitor 16 and the memory 19 is controlled. By this reset, a state (potential) of the clamp capacitor 16 and the memory 19 is set to a reference state (a reference potential or a reset level).

The second amplification transistor 21 amplifies the voltage based on the imaging signal held in the memory 19 and outputs the amplified voltage as an imaging signal from the source. A second current source 23 connected to the vertical signal line 26 functions as a load of the second amplification transistor 21 and supplies a current for driving the second amplification transistor 21 to the second amplification transistor 21. The second amplification transistor 21 and the second current source 23 constitute a source follower circuit.

The selection transistor 22 is connected to the second amplification transistor 21 and the vertical signal line 26. The selection transistor 22 switches between a state in which the second amplification transistor 21 and the vertical signal line 26 are electrically connected to each other and a state in which the second amplification transistor 21 and the vertical signal line 26 are electrically isolated from each other. By turning on the selection transistor 22, the second amplification transistor 21 and the vertical signal line 26 are electrically connected to each other. By turning off the selection transistor 22, the second amplification transistor 21 and the vertical signal line 26 are electrically isolated from each other. When the second amplification transistor 21 and the vertical signal line 26 are electrically connected to each other, the selection transistor 22 outputs the imaging signal output from the second amplification transistor 21 to the vertical signal line 26. ON and OFF of the selection transistor 22 are controlled by the control signal S22A from the vertical driving circuit 601.

The second amplification transistor 21 and the selection transistor 22 constitute a signal output circuit. The signal output circuit outputs the imaging signal held in the memory 19 to the vertical signal line 26.

Configurations of the second pixel, the third pixel, and the fourth pixel are the same as that of the first pixel. For convenience of description, a control signal supplied to each transistor included in each of the second pixel, the third pixel, and the fourth pixel is distinguished from the control signal supplied to the transistor of the first pixel.

In the second pixel, a control signal S11B is supplied to the transfer transistor 11, a control signal S13B is supplied to the reset transistor 13, a control signal S18B is supplied to the sample-and-hold transistor 18, a control signal S20B is supplied to the clamp transistor 20, and a control signal S22B is supplied to the selection transistor 22. In the third pixel, a control signal S11C is supplied to the transfer transistor 11, a control signal S13C is supplied to the reset transistor 13, a control signal S18C is supplied to the sample-and-hold transistor 18, a control signal S20C is supplied to the clamp transistor 20, and a control signal S22C is supplied to the selection transistor 22. In the fourth pixel, a control signal S11D is supplied to the transfer transistor 11, a control signal S13D is supplied to the reset transistor 13, a control signal S18D is supplied to the sample-and-hold transistor 18, a control signal S20D is supplied to the clamp transistor 20, and a control signal S22D is supplied to the selection transistor 22.

The configuration of the pixel 100 is not limited to the configuration shown in FIG. 2.

The pixel group unit 101 further includes a pixel connection transistor 24 (a second connection transistor) and a pixel connection transistor 25 (a second connection transistor). The pixel connection transistor 24 is connected to two adjacent pixels 100 in the column direction. The pixel connection transistor 25 is connected to two adjacent pixels 100 in the row direction. The pixel connection transistor 24 and the pixel connection transistor 25 have a first end and a second end. One of the first end and the second end of the pixel connection transistor 24 and the pixel connection transistor 25 is a source and the other of the first end and the second end of the pixel connection transistor 24 and the pixel connection transistor 25 is a drain.

The first end of the pixel connection transistor 24 is connected to the FD 12 of the first pixel or the third pixel. The second end of the pixel connection transistor 24 is connected to the FD 12 of the second pixel or the fourth pixel. A gate of the pixel connection transistor 24 is connected to the vertical driving circuit 601. A control signal S24 is supplied from the vertical driving circuit 601 to the gate of the pixel connection transistor 24.

A first end of the pixel connection transistor 25 is connected to the FD 12 of the first pixel or the second pixel. A second end of the pixel connection transistor 25 is connected to the FD 12 of the third pixel or the fourth pixel. A gate of the pixel connection transistor 25 is connected to the horizontal driving circuit 602. A control signal S25 is supplied from the horizontal driving circuit 602 to the gate of the pixel connection transistor 25.

The pixel connection transistor 24 and the pixel connection transistor 25 are connected to two or more FDs 12 included in each of the plurality of pixel group units 101. The pixel connection transistor 24 and the pixel connection transistor 25 switch between a state in which two or more FDs 12 are electrically connected to each other and a state in which two or more FDs 12 are electrically isolated from each other. When at least one of the pixel connection transistor 24 and the pixel connection transistor 25 is turned ON, the two or more FDs 12 are electrically connected to each other. By turning off at least one of the pixel connection transistor 24 and the pixel connection transistor 25, the two or more FDs 12 are electrically isolated from each other. When two or more FDs 12 are electrically connected to each other, at least one of the pixel connection transistor 24 and the pixel connection transistor 25 adds the imaging signals held in the two or more FDs 12. ON and OFF of the pixel connection transistor 24 are controlled by the control signal S24 from the vertical driving circuit 601. ON and OFF of the pixel connection transistor 25 are controlled by the control signal S25 from the horizontal driving circuit 602. By electrically connecting the two or more FDs 12, a signal obtained by adding the imaging signals output from the plurality of photoelectric conversion elements 10 included in the pixel group unit 101 is held in the two or more FDs 12. The two or more FDs 12 included in the same pixel group unit 101 are electrically connected to each other by the pixel connection transistor 24 and the pixel connection transistor 25.

When the pixel connection transistor 24 is ON, the two or more FDs 12 arranged in the column direction are electrically connected to each other. When the pixel connection transistor 25 is ON, the two or more FDs 12 arranged in the row direction are electrically connected to each other. In the example shown in FIG. 2, each of the pixel connection transistor 24 and the pixel connection transistor 25 is connected to the two FDs 12 included in the two pixels 100. Each of the pixel connection transistor 24 and the pixel connection transistor 25 may be connected to three or more FDs 12 included in three or more pixels 100.

The transistors included in the pixel group unit 101 shown in FIG. 2 are NMOS transistors. The transistors included in the pixel group unit 101 may be PMOS transistors. In this case, polarities of the power supply and the ground are opposite.

A plurality of vertical signal lines 26 are arranged. The vertical signal lines 26 are arranged in each column in the array of the plurality of pixels 100. The plurality of vertical signal lines 26 extend in the column direction. Each of the plurality of vertical signal lines 26 is connected to the pixel 100 of each column in the array of the plurality of pixels 100, and the second current source 23 is connected to the vertical signal line 26. The vertical signal line 26 is connected to the signal reading circuit 700. The imaging signal output from each pixel 100 to the vertical signal line 26 is transferred to the signal reading circuit 700 by the vertical signal line 26.

As described above, the solid-state imaging device 1 includes the plurality of pixels 100, and the pixel control circuit 600. Each of the plurality of pixels 100 includes the photoelectric conversion element 10, the memory 19, the signal transfer circuit (the transfer transistor 11, the FD 12, the first amplification transistor 14, the first current source 15, the clamp capacitor 16, the sample-and-hold transistor 18), and the signal output circuit (the second amplification transistor 21 and the selection transistor 22). The photoelectric conversion element 10 performs imaging and outputs the imaging signal. The memory 19 holds the imaging signal. The signal transfer circuit transfers the imaging signal output from the photoelectric conversion element 10 to the memory 19. The signal output circuit outputs the imaging signal held in the memory 19 to the signal line (the vertical signal line 26). Each of the plurality of pixels 100 is included in any one of the plurality of pixel group units 101. Each of the plurality of pixel group units 101 includes two or more pixels 100.

The photoelectric conversion element 10 outputs charge as the imaging signal. The signal transfer circuit includes the FD 12 (floating diffusion), the transfer transistor 11, the memory output circuit (the first amplification transistor 14, the first current source 15, and the clamp capacitor 16), and the sample-and-hold transistor 18 (the first connection transistor). The FD 12 holds the voltage based on the charge output from the photoelectric conversion element 10. The transfer transistor 11 transfers the charge output from the photoelectric conversion element 10 to the FD 12. The memory output circuit outputs the imaging signal based on the voltage held in the FD 12 to the memory 19. The sample-and-hold transistor 18 is connected to the memory output circuit and the memory 19. The sample-and-hold transistor 18 switches between a state in which the memory output circuit and the memory 19 are electrically connected to each other and a state in which the memory output circuit and the memory 19 are electrically isolated from each other. The solid-state imaging device 1 further includes the pixel connection transistor 24 (the second connection transistor) and the pixel connection transistor 25 (the second connection transistor). The pixel connection transistor 24 and the pixel connection transistor 25 are connected to two or more FDs 12 included in each of the plurality of pixel group units 101. The pixel connection transistor 24 and the pixel connection transistor 25 switch between a state in which the two or more FDs 12 are electrically connected to each other and a state in which the two or more FDs 12 are electrically isolated from each other.

The operation of the solid-state imaging device 1 will be described. The pixel control circuit 600 controls the signal transfer circuit so that imaging operations are performed simultaneously in the plurality of pixel group units 101 and a plurality of imaging operations are performed in each of the plurality of pixel group units 101. In each of the plurality of imaging operations, the imaging signal output from at least one of the two or more photoelectric conversion elements 10 included in each of the plurality of pixel group units 101 is transferred to one of two or more memories 19 included in each of the plurality of pixel group units 101. Each of the two or more memories 19 included in each of the plurality of pixel group units 101 holds the imaging signal in a predetermined order. At least one of the imaging signals held in the memory 19 in each of the plurality of imaging operations is output to the vertical signal line 26 in a period in which any one of a plurality of imaging operations is performed or a period after the plurality of imaging operations have been completed.

In each of the plurality of imaging operations, the signal obtained by adding the imaging signals output from all of the photoelectric conversion elements 10 included in each of the plurality of pixel group units 101 is transferred to one of the two or more memories 19 included in each of the plurality of pixel group units 101.

A first operation of the solid-state imaging device 1 will be described. When the imaging signals output from the photoelectric conversion element 10 are added, the pixel control circuit 600 electrically connects the memory output circuit to the memory 19 using the sample-and-hold transistor 18, and also electrically connects the two or more FDs 12 to each other using the pixel connection transistor 24 and the pixel connection transistor 25. After the memory output circuit and the memory 19 are electrically connected to each other and the two or more FDs 12 are electrically connected to each other, the pixel control circuit 600 transfers the charge output from the photoelectric conversion element 10 to the FD 12 using the transfer transistor 11.

Figure 3:
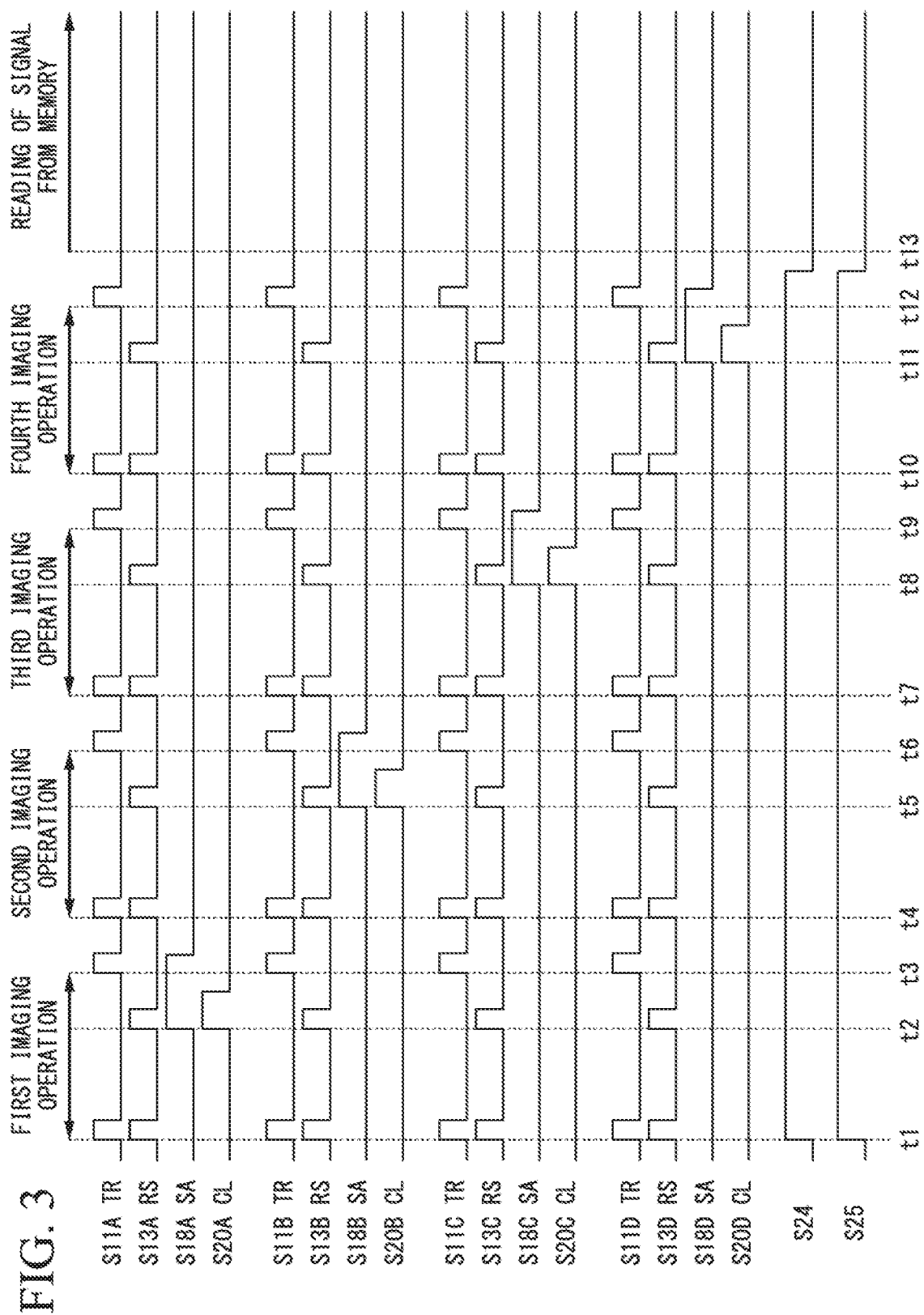
FIG. 3 is a timing chart showing a first operation of the solid-state imaging device according to the first embodiment of the present invention.

FIG. 3 shows the first operation of the solid-state imaging device 1. In FIG. 3, a waveform of each control signal is shown. In FIG. 3, a horizontal direction indicates time and a vertical direction indicates a voltage. In FIG. 3, the imaging operation is performed four times. Therefore, an imaging signal of four frames is acquired. The respective imaging operations are performed simultaneously in the plurality of pixel group units 101.

Before time t1, each control signal is at an L (Low) level. At time t1, the control signal S24 and the control signal S25 change from the L level to an H (High) level. Accordingly, the pixel connection transistor 24 and the pixel connection transistor 25 are turned ON. Therefore, the four FDs 12 included in each pixel group unit 101 are electrically connected to each other.

At time t1, the control signal S11A and the control signal S13A change from the L level to the H level. As a result, the transfer transistor 11 and the reset transistor 13 in the first pixel are turned ON. Therefore, the photoelectric conversion element 10 in the first pixel is reset. Thereafter, the control signal S11A and the control signal S13A change front the H level to the L level. Accordingly, the transfer transistor 11 and the reset transistor 13 in the first pixel are turned OFF. At this timing, the photoelectric conversion element 10 in the first pixel starts imaging. That is, the photoelectric conversion element 10 starts accumulation of charge, that is, generation of the imaging signal. The same operation is performed in the second pixel, the third pixel, and the fourth pixel. Therefore, the photoelectric conversion elements 10 in all the pixels 100 arranged in the solid-state imaging device 1 start imaging at the same time.

At time t2 after time t1, the control signal S13A changes from the L level to the H level. Accordingly, the reset transistor 13 in the first pixel is turned ON. Therefore, the FD 12 in the first pixel is reset. Thereafter, the control signal S13A changes from the H level to the L level. Accordingly, the reset transistor 13 in the first pixel is turned OFF. The same operation is performed in the second pixel, the third pixel, and the fourth pixel. Therefore, in all the pixels 100 arranged in the solid-state imaging device 1, the FDs 12 are simultaneously reset.

At time t2, the control signal S18A and the control signal S20A change from the L level to the H level. Accordingly, the sample-and-hold transistor 18 and the clamp transistor 20 in the first pixel are turned ON. Therefore, the clamp capacitor 16 and the memory 19 in the first pixel are reset. Thereafter, the control signal S20A changes from the H level to the L level. Accordingly, the clamp transistor 20 in the first pixel is turned OFF.

At time t3 after time t2, the control signal S11A changes from the L level to the H level. Accordingly, the transfer transistor 11 in the first pixel is turned ON. Therefore, the charge output from the photoelectric conversion element 10 in the first pixel is transferred to the FD 12. At this timing, the photoelectric conversion element 10 in the first pixel ends imaging. That is, the photoelectric conversion element 10 ends the accumulation of charge, that is, the generation of the imaging signal. Thereafter, the control signal S11A changes from the H level to the L level. Accordingly, the transfer transistor 11 in the first pixel is turned OFF. The same operation is performed in the second pixel, the third pixel, and the fourth pixel. Therefore, the charge output from the photoelectric conversion elements 10 in all the pixels 100 arranged in the solid-state imaging device 1 is transferred to the FDs 12, such that the photoelectric conversion elements 10 in all the pixels 100 end the imaging at the same time. From time t1 to time t3, the first imaging operation is simultaneously performed in the plurality of pixel group units 101. Since the four FDs 12 included in each pixel group unit 101 are electrically connected to each other, the charge held in the four FDs 12 is added (averaged).

At time t3, the first amplification transistor 14 in the first pixel amplifies the voltage based on the added charge held in the FDs 12, and outputs the amplified voltage as the imaging signal. The imaging signal output from the first amplification transistor 14 in the first pixel is held in the clamp capacitor 16. Since the sample-and-hold transistor 18 in the first pixel is ON, the sample-and-hold transistor 18 samples the voltage of the second end of the clamp capacitor 16. Accordingly, the sample-and-hold transistor 18 in the first pixel transfers the imaging signal output from the first amplification transistor 14 to the memory 19 in the first pixel, and the memory 19 holds the imaging signal.

After the photoelectric conversion elements 10 in the first to fourth pixels end imaging in the first imaging operation, the control signal S18A changes from the H level to the L level. Accordingly, the sample-and-hold transistor 18 in the first pixel is turned OFF.

At time t4 after time t3, the same operation as the operation at time t1 is performed. That is, the photoelectric conversion elements 10 in all the pixels 100 arranged in the solid-state imaging device 1 simultaneously start imaging.

At time t5 after time t4, the same operation as the operation at time t2 is performed. That is, in all the pixels 100 arranged in the solid-state imaging device 1, the FDs 12 are simultaneously reset.

At time t5, the control signal S18B and the control signal S20B change from the L level to the H level. Accordingly, the sample-and-hold transistor 18 and the clamp transistor 20 in the second pixel are turned ON. Therefore, the clamp capacitor 16 and the memory 19 in the second pixel are reset. Thereafter, the control signal S20B changes from the H level to the L level. Accordingly, the clamp transistor 20 in the second pixel is turned OFF.

At time t6 after rime t5, the same operation as that at time t3 is performed. That is, the charge output from the photoelectric conversion elements 10 in all the pixels 100 arranged in the solid-state imaging device 1 is transferred to the FDs 12, such that the photoelectric conversion elements 10 in all the pixels 100 end the imaging at the same time. From time t4 to time t6, a second imaging operation is simultaneously performed in the plurality of pixel group units 101. Since the four FDs 12 included in each pixel group unit 101 are electrically connected to each other, the charge held in the four FDs 12 is added (averaged).

At time t6, the first amplification transistor 14 in the second pixel amplifies the voltage based on the added charge held in the FDs 12, and outputs the amplified voltage as an imaging signal. The imaging signal output from the first amplification transistor 14 in the second pixel is held in the clamp capacitor 16. Since the sample-and-hold transistor 18 in the second pixel is ON, the sample-and-hold transistor 18 samples the voltage of the second end of the clamp capacitor 16. Accordingly, the sample-and-hold transistor 18 in the second pixel transfers the imaging signal output from the first amplification transistor 14 to the memory 19 in the second pixel, and the memory 19 holds the imaging signal.

After the photoelectric conversion elements 10 in the first to fourth pixels end the imaging in the second imaging operation, the control signal S18B changes from the H level to the L level. Accordingly, the sample-and-hold transistor 18 in the second pixel is turned OFF.

At time t7 after time t6, the same operation as that at time t1 is performed. That is, the photoelectric conversion elements 10 in all the pixels 100 arranged in the solid-state imaging device 1 simultaneously start imaging.

At time t8 after time t7, the same operation as the operation at time t2 is performed. That is, in all the pixels 100 arranged in the solid-state imaging device 1, the FDs 12 are simultaneously reset.

At time t8, the control signal S18C and the control signal S20C change from the L level to the H level. Accordingly, the sample-and-hold transistor 18 and the clamp transistor 20 in the third pixel are turned ON. Therefore, the clamp capacitor 16 and the memory 19 in the third pixel are reset. Thereafter, the control signal S20C changes from the H level to the L level. Accordingly, the clamp transistor 20 in the third pixel is turned OFF.

At time t9 after time t8, the same operation as the operation at time t3 is performed. That is, the charge output from the photoelectric conversion elements 10 in all the pixels 100 arranged in the solid-state imaging device 1 is transferred to the FDs 12, such that the photoelectric conversion elements 10 in all the pixels 100 end the imaging at the same time. From time t7 to time t9, a third imaging operation is simultaneously performed in the plurality of pixel group units 101. Since the four FDs 12 included in each pixel group unit 101 are electrically connected to each other, the charge held in the four FDs 12 is added (averaged).

At time t9, the first amplification transistor 14 in the third pixel amplifies the voltage based on the added charge held in the FDs 12, and outputs the amplified voltage as an imaging signal. The imaging signal output from the first amplification transistor 14 in the third pixel is held in the clamp capacitor 16. Since the sample-and-hold transistor 18 in the third pixel is ON, the sample-and-hold transistor 18 samples the voltage of the second end of the clamp capacitor 16. Accordingly, the sample-and-hold transistor 18 in the third pixel transfers the imaging signal output from the first amplification transistor 14 to the memory 19 in the third pixel, and the memory 19 holds the imaging signal.

After the photoelectric conversion elements 10 in the first to fourth pixels end the imaging in the third imaging operation, the control signal S18C changes from the H level to the L level. Accordingly, the sample-and-hold transistor 18 in the third pixel is turned OFF.

At time t10 after time t9, the same operation as the operation at time t1 is performed. That is, the photoelectric conversion elements 10 in all the pixels 100 arranged in the solid-state imaging device 1 simultaneously start imaging.

At time t11 after time t10, the same operation as the operation at time t2 is performed. That is, in all the pixels 100 arranged in the solid-state imaging device 1, the FDs 12 are simultaneously reset.

At time t11, the control signal S18D and the control signal S20D change from the L level to the H level. Accordingly, the sample-and-hold transistor 18 and the clamp transistor 20 in the fourth pixel are turned ON. Therefore, the clamp capacitor 16 and the memory 19 in the fourth pixel are reset. Thereafter, the control signal S20C changes from the H level to the L level. Accordingly, the clamp transistor 20 in the fourth pixel is turned OFF.

At time t12 after time t11, the same operation as that at time t3 is performed. That is, the charge output from the photoelectric conversion elements 10 in all the pixels 100 arranged in the solid-state imaging device 1 is transferred to the FDs 12, such that the photoelectric conversion elements 10 in all the pixels 100 end the imaging at the same time. From time t10 to time t112, the fourth imaging operation is simultaneously performed in the plurality of pixel group units 101. Since the four FDs 12 included in each pixel group unit 101 are electrically connected to each other, the charge held in the four FDs 12 is added (averaged).

At time t12, the first amplification transistor 14 in the fourth pixel amplifies the voltage based on the added charge held in the FDs 12, and outputs the amplified voltage as an imaging signal. The imaging signal output from the first amplification transistor 14 in the fourth pixel is held in the clamp capacitor 16. Since the sample-and-hold transistor 18 in the fourth pixel is ON, the sample-and-hold transistor 18 samples the voltage of the second end of the clamp capacitor 16. Accordingly, the sample-and-hold transistor 18 in the fourth pixel transfers the imaging signal output from the first amplification transistor 14 to the memory 19 in the fourth pixel, and the memory 19 holds the imaging signal.

After the photoelectric conversion elements 10 in the first to fourth pixels end the imaging in the fourth imaging operation, the control signal S18D changes from the H level to the L level. Accordingly, the sample-and-hold transistor 18 in the fourth pixel is turned OFF.

After the photoelectric conversion element 10 in the fourth pixel ends the imaging, the control signal S24 and the control signal S25 change from the H level to the L level. Accordingly, the pixel connection transistor 24 and the pixel connection transistor 25 are turned OFF.

The imaging signals are held in the four memories 19 included in each pixel group unit 101 by the first to fourth imaging operations. In each of the first to fourth imaging operations, the imaging signals output from the four photoelectric conversion elements 10 included in each pixel group unit 101 are sequentially transferred to one of the four memories 19 included in each pixel group unit 101. The four memories 19 included in each pixel group unit 101 hold imaging signals in a predetermined order. That is, the memory 19 in the first pixel holds the imaging signal by the first imaging operation. Thereafter, the memory 19 in the second pixel holds the imaging signal by the second imaging operation. Thereafter, the memory 19 in the third pixel holds the imaging signal by the third imaging operation. Thereafter, the memory 19 in the fourth pixel holds the imaging signal by the fourth imaging operation.

After time t13 after time t12, the imaging signals held in the memory 19 are read. That is, the signal output circuit outputs the imaging signal held in the memory 19 to the vertical signal line 26. Specifically, the second amplification transistor 21 amplifies the voltage based on the imaging signal held in the memory 19, and outputs the amplified voltage as an imaging signal. The selection transistor 22 outputs the imaging signal output from the second amplification transistor 21 to the vertical signal line 26.

Reading of the imaging signal is performed for each row in the array of the plurality of pixels 100. That is, after the imaging signals are output from all the pixels 100 arranged in a first row to the vertical signal line 26, the imaging signals are output from all the pixels 100 arranged in a second row different from the first row to the vertical signal line 26. The first row and the second row are arbitrary rows among a plurality of rows.

In the example shown in FIG. 3, imaging stop periods are a period from time t3 to time t4, a period from time t6 to time t7, and a period from time t9 to time t10. When all of the imaging signals held in the memory 19 by one imaging operation are output to the vertical signal line 26 in one imaging stop period, the imaging stop period becomes long.

That is, an imaging interval becomes long. Therefore, at least one of the imaging signals held in the memory 19 in each of the plurality of imaging operations is output to the signal line 26 in a period in which any one of a plurality of imaging operations is performed, or in a period after a plurality of imaging operations have ended.

In the example shown in FIG. 3, all of the imaging signals held in the memory 19 in the first to fourth imaging operations are output to the vertical signal line 26 in the period after the fourth imaging operations have ended. The plurality of pixels 100 can simultaneously perform the imaging operation and the operation of reading the imaging signal. At least one of the imaging signals held in the memory 19 in each of the first to fourth imaging operations may be output to the vertical signal line 26 in a period in which any one of the first to fourth imaging operations is performed. The output of the imaging signal to the vertical signal line 26 may be prohibited in the imaging stop period between the plurality of imaging operations. In this case, all of the imaging signals held in the memory 19 in each of the plurality of imaging operations are output to the vertical signal line 26 in a period in which any one of a plurality of imaging operations is performed or in a period after the plurality of imaging operations have ended.

The imaging signals output from two or more photoelectric conversion elements 10 included in each of the plurality of pixel group units 101 need not be added. For example, the pixel connection transistor 24 and the pixel connection transistor 25 may be always OFF. Alternatively, the pixel connection transistor 24 and the pixel connection transistor 25 need not be arranged. When the pixel connection transistor 24 is not arranged, the vertical driving circuit 601 does not need to generate the control signal S24. When the pixel connection transistor 25 is not arranged, the horizontal driving circuit 602 need not be arranged. When imaging signals are not added, the imaging signal output from one photoelectric conversion element 10 is held in one FD 12 in the first to fourth imaging operations. By adding the imaging signals as in the operation shown in FIG. 3, a noise included in the imaging signal is reduced. That is, S/N of the imaging signal is improved. When imaging is performed at a high speed in order to realize a high frame rate, an accumulation time of the photoelectric conversion element 10 is short. Therefore, the amount of charge accumulated in the photoelectric conversion element 10 is small. In this case, the S/N of the imaging signal easily deteriorates. However, since the S/N of the imaging signal is improved by adding the imaging signals, the solid-state imaging device 1 can perform the imaging at a high speed.

As described above, at least one of the imaging signals held in the memory 19 in each of the plurality of imaging operations is output to the vertical signal line 26 in the period in which any one of a plurality of imaging operations is performed or the period after a plurality of imaging operations have ended. This shortens the imaging stop period between the plurality of imaging operations. That is, the imaging interval is shortened.

The second operation of the solid-state imaging device 1 will be described. When the imaging signals output from the photoelectric conversion elements 10 are added, the pixel control circuit 600 electrically connects the memory output circuit to the memory 19 using the sample-and-hold transistor 18. After the memory output circuit and the memory 19 are electrically connected to each other, the pixel control circuit 600 transfers the charge output from the photoelectric conversion element 10 to the FD 12 using the transfer transistor 11. After the charge output from the photoelectric conversion element 10 is transferred to the FD 12, the pixel control circuit 600 electrically connects two or more FDs 12 using the pixel connection transistor 24 and the pixel connection transistor 25.

Figure 4:
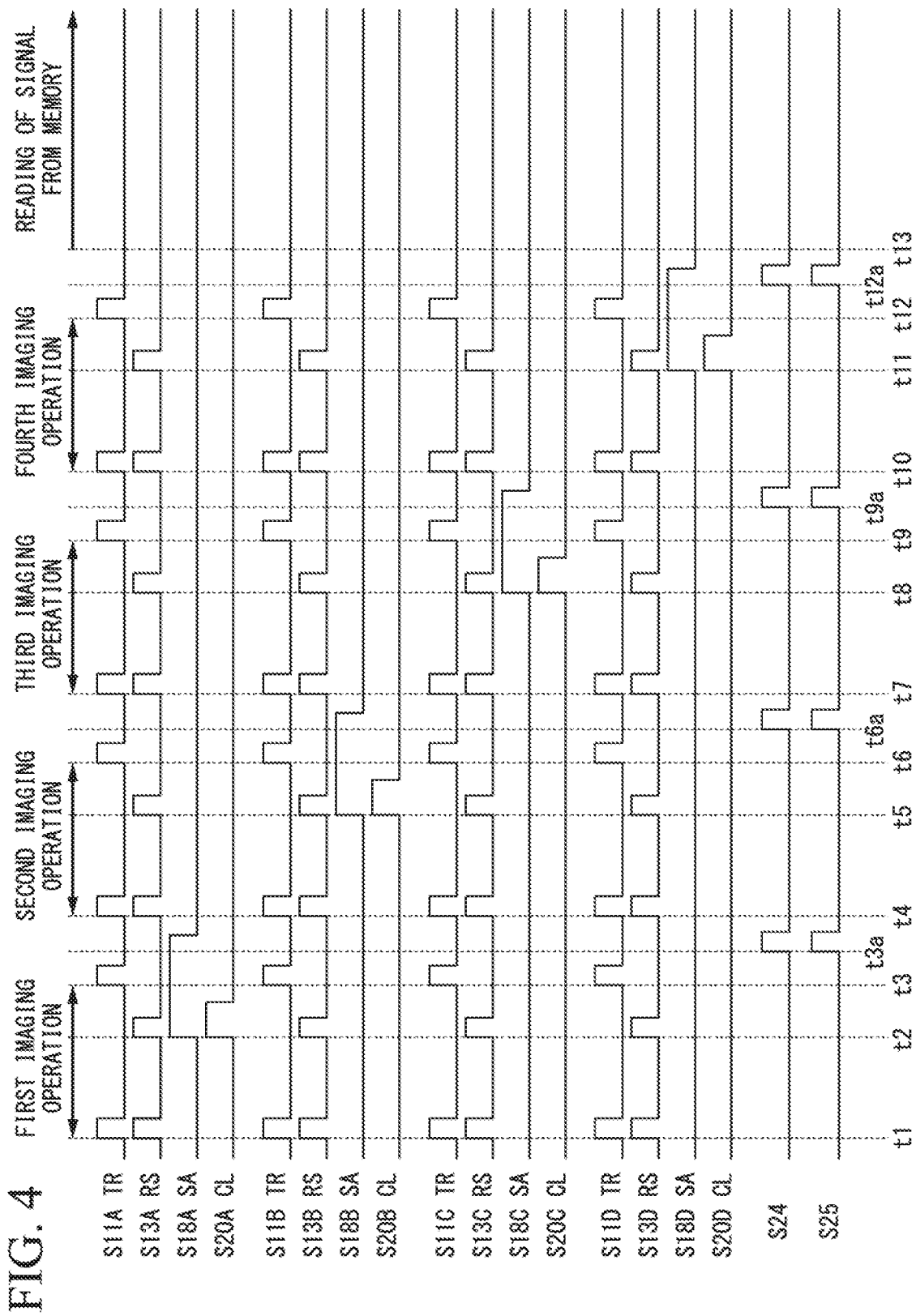
FIG. 4 is a timing chart showing a second operation of the solid-state imaging device according to the first embodiment of the present invention.

FIG. 4 shows the second operation of the solid-state imaging device 1. In FIG. 4, a waveform of each control signal is shown. In FIG. 4, a horizontal direction indicates time and a vertical direction indicates a voltage. In FIG. 4, an imaging operation is performed four times. Therefore, an imaging signal of four frames is acquired. Each imaging operation is performed simultaneously in the plurality of pixel group units 101. In the operation shown in FIG. 4, aspects different from those in the operation shown in FIG. 3 will be described.

At time t3a after time t3, the control signal S24 and the control signal S25 change from the L level to the H level. Accordingly, the pixel connection transistor 24 and the pixel connection transistor 25 are turned ON. Therefore, the four FDs 12 included in each pixel group unit 101 are electrically connected to each other. Therefore, the charge held in the four FDs 12 is added (averaged). In this case, the first amplification transistor 14 in the first pixel amplifies the voltage based on the added charge held in the FDs 12, and outputs the amplified voltage as an imaging signal. The imaging signal output from the first amplification transistor 14 in the first pixel is held in the clamp capacitor 16. Since the sample-and-hold transistor 18 in the first pixel is ON, the sample-and-hold transistor 18 samples the voltage of the second end of the clamp capacitor 16. Accordingly, the sample-and-hold transistor 18 in the first pixel transfers the imaging signal output from the first amplification transistor 14 to the memory 19 in the first pixel, and the memory 19 holds the imaging signal.

Thereafter, the control signal S24 and the control signal S25 change from the H level to the L level. Accordingly, the pixel connection transistor 24 and the pixel connection transistor 25 are turned OFF. Further, the control signal S18A changes from the H level to the L level. Accordingly, the sample-and-hold transistor 18 in the first pixel is turned OFF.

At time t6a after time t6, the control signal S24 and the control signal S25 change from the L level to the H level. Accordingly, the pixel connection transistor 24 and the pixel connection transistor 25 are turned ON. Therefore, the four FDs 12 included in each pixel group unit 101 are electrically connected to each other. Therefore, the charge held in the four FDs 12 is added (averaged). In this case, the first amplification transistor 14 in the second pixel amplifies the voltage based on the added charge held in the FDs 12, and outputs the amplified voltage as an imaging signal. The imaging signal output from the first amplification transistor 14 in the second pixel is held in the clamp capacitor 16. Since the sample-and-hold transistor 18 in the second pixel is ON, the sample-and-hold transistor 18 samples the voltage of the second end of the clamp capacitor 16. Accordingly, the sample-and-hold transistor 18 in the second pixel transfers the imaging signal output from the first amplification transistor 14 to the memory 19 in the second pixel, and the memory 19 holds the imaging signal.

Thereafter, the control signal S24 and the control signal S25 change from the H level to the L level. Accordingly, the pixel connection transistor 24 and the pixel connection transistor 25 are turned OFF. Further, the control signal S18B changes from the H level to the L level. Accordingly, the sample-and-hold transistor 18 in the second pixel is turned OFF.

At time t9a after time t9, the control signal S24 and the control signal S25 change from the L level to the H level. Accordingly, the pixel connection transistor 24 and the pixel connection transistor 25 are turned ON. Therefore, the four FDs 12 included in each pixel group unit 101 are electrically connected to each other. Therefore, the charge held in the four FDs 12 is added (averaged). In this case, the first amplification transistor 14 in the third pixel amplifies the voltage based on the added charge held in the FDs 12, and outputs the amplified voltage as an imaging signal. The imaging signal output from the first amplification transistor 14 in the third pixel is held in the clamp capacitor 16. Since the sample-and-hold transistor 18 in the third pixel is ON, the sample-and-hold transistor 18 samples the voltage of the second end of the clamp capacitor 16. Accordingly, the sample-and-hold transistor 18 in the third pixel transfers the imaging signal output from the first amplification transistor 14 to the memory 19 in the third pixel, and the memory 19 holds the imaging signal.

Thereafter, the control signal S24 and the control signal S25 change from the H level to the L level. Accordingly, the pixel connection transistor 24 and the pixel connection transistor 25 are turned OFF. Further, the control signal S18C changes from the H level to the L level. Accordingly, the sample-and-hold transistor 18 in the third pixel is turned OFF.

At time t12a after time t12, the control signal S24 and the control signal S25 change from the L level to the H level. Accordingly, the pixel connection transistor 24 and the pixel connection transistor 25 are turned ON. Therefore, the four FDs 12 included in each pixel group unit 101 are electrically connected to each other. Therefore, the charge held in the four FDs 12 is added (averaged). In this case, the first amplification transistor 14 in the fourth pixel amplifies the voltage based on the added charge held in the FDs 12, and outputs the amplified voltage as an imaging signal. The imaging signal output from the first amplification transistor 14 in the fourth pixel is held in the clamp capacitor 16. Since the sample-and-hold transistor 18 in the fourth pixel is ON, the sample-and-hold transistor 18 samples the voltage of the second end of the clamp capacitor 16. Accordingly, the sample-and-hold transistor 18 in the fourth pixel transfers the imaging signal output from the first amplification transistor 14 to the memory 19 in the fourth pixel, and the memory 19 holds the imaging signal.

Thereafter, the control signal S24 and the control signal S25 change from the H level to the L level. Accordingly, the pixel connection transistor 24 and the pixel connection transistor 25 are turned OFF. Further, the control signal S18D changes from the H level to the L level. Accordingly, the sample-and-hold transistor 18 in the fourth pixel is turned OFF.

Regarding aspects other than the above, the operation shown in FIG. 4 is the same as the operation shown in FIG. 3.

In the first operation of the solid-state imaging device 1, at least one of the pixel connection transistor 24 and the pixel connection transistor 25 is always ON, such that two or more FDs 12 may be electrically connected to each other always. At least one of the pixel connection transistor 24 and the pixel connection transistor 25 need not be arranged and the two or more FDs 12 may be directly connected to each other by a signal line. In this case, the solid-state imaging device 1 can perform the first operation. When the pixel connection transistor 24 is not arranged, the vertical driving circuit 601 does not need to generate the control signal S24. When the pixel connection transistor 25 is not arranged, the horizontal driving circuit 602 need not be arranged.

The operation of the solid-state imaging device 1 is not limited to the operations shown in FIGS. 3 and 4.

The solid-state imaging device of each aspect of the present invention need not have a configuration corresponding to at least one of the horizontal driving circuit 602 and the signal reading circuit 700. The pixels in the solid-state imaging device according to each aspect of the present invention need not have a configuration corresponding to at least one of the reset transistor 13 and the clamp transistor 20.

In the first embodiment, the pixel control circuit 600 controls the signal transfer circuit so that imaging operations are performed simultaneously in the plurality of pixel group units 101, and a plurality of imaging operations are performed in each of the plurality of pixel group units 101. In each of a plurality of imaging operations, the imaging signal output from at least one of two or more photoelectric conversion elements 10 included in each of the plurality of pixel group units 101 is transferred to one of two or more memories 19 included in each of the plurality of pixel group units 101. Each of the two or more memories 19 included in each of the plurality of pixel group units 101 holds the imaging signal in a predetermined order. At least one of the imaging signals held in the memory 19 in each of the plurality of imaging operations is output to the vertical signal line 26 in a period in which any one of the plurality of imaging operations is performed or a period after the plurality of imaging operations have ended. Therefore, the solid-state imaging device 1 can shorten the imaging interval.

The solid-state imaging device 1 can improve the S/N of the imaging signal by adding imaging signals.

Second Embodiment

Figure 5:
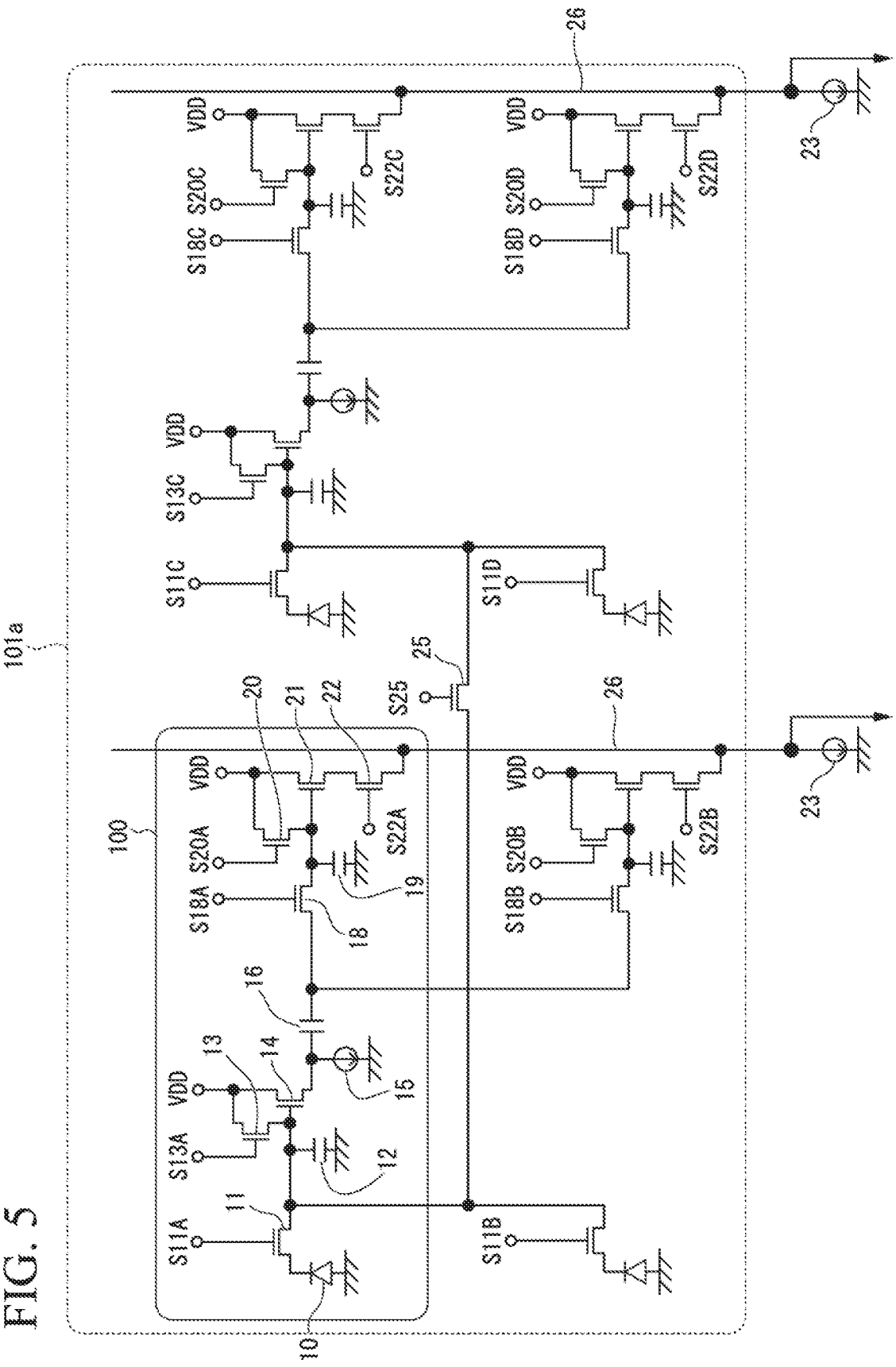
FIG. 5 is a circuit diagram of a pixel group unit in a solid-state imaging device according to a second embodiment of the present invention.

In a second embodiment of the present invention, the pixel group unit 101 shown in FIG. 2 is changed to the pixel group unit 101a shown in FIG. 5.

FIG. 5 shows a configuration of the pixel group unit 101a. One pixel group unit 101a includes four pixels 100. In FIG. 5, a reference numeral of one pixel 100 is indicated as a representative. For only one pixel 100, reference numerals of elements constituting the pixel 100 is indicated. For the configuration shown in FIG. 5, aspects different from the configuration shown in FIG. 2 will be described.

Some of the elements constituting the pixel 100 are shared among two or more pixels 100 included in the plurality of pixel group units 101a. At least two of the pixels 100 included in the plurality of pixel group units 101a are arranged in the same column in an array of the plurality of pixels 100. In FIG. 5, a FD 12, a reset transistor 13, a first amplification transistor 14, a first current source 15, and a clamp capacitor 16 are shared between two pixels 100 adjacent in the column direction. That is, elements other than a transfer transistor 11 among elements constituting the signal transfer circuit are shared between the two pixels 100 adjacent in the column direction. Further, a memory output circuit is shared between the two pixels 100 adjacent in the column direction. In FIG. 5, the elements are shared between a first pixel and a second pixel, and the elements are shared between a third pixel and a fourth pixel.

A pixel connection transistor 24 is not arranged. The four FDs 12 included in each of the plurality of pixel group units 101a are connected to one pixel connection transistor 25. By turning on the pixel connection transistor 25, the four FDs 12 are electrically connected to each other.

For aspects other than the above, the configuration shown in FIG. 5 is the same as the configuration shown in FIG. 2.

Each of the plurality of pixel group units 101a may include three or more pixels 100 arranged in the same column in the array of the plurality of pixels 100. Some of the elements constituting the pixel 100 may be shared among three or more pixels 100 that are continuous in the column direction.

Figure 6:
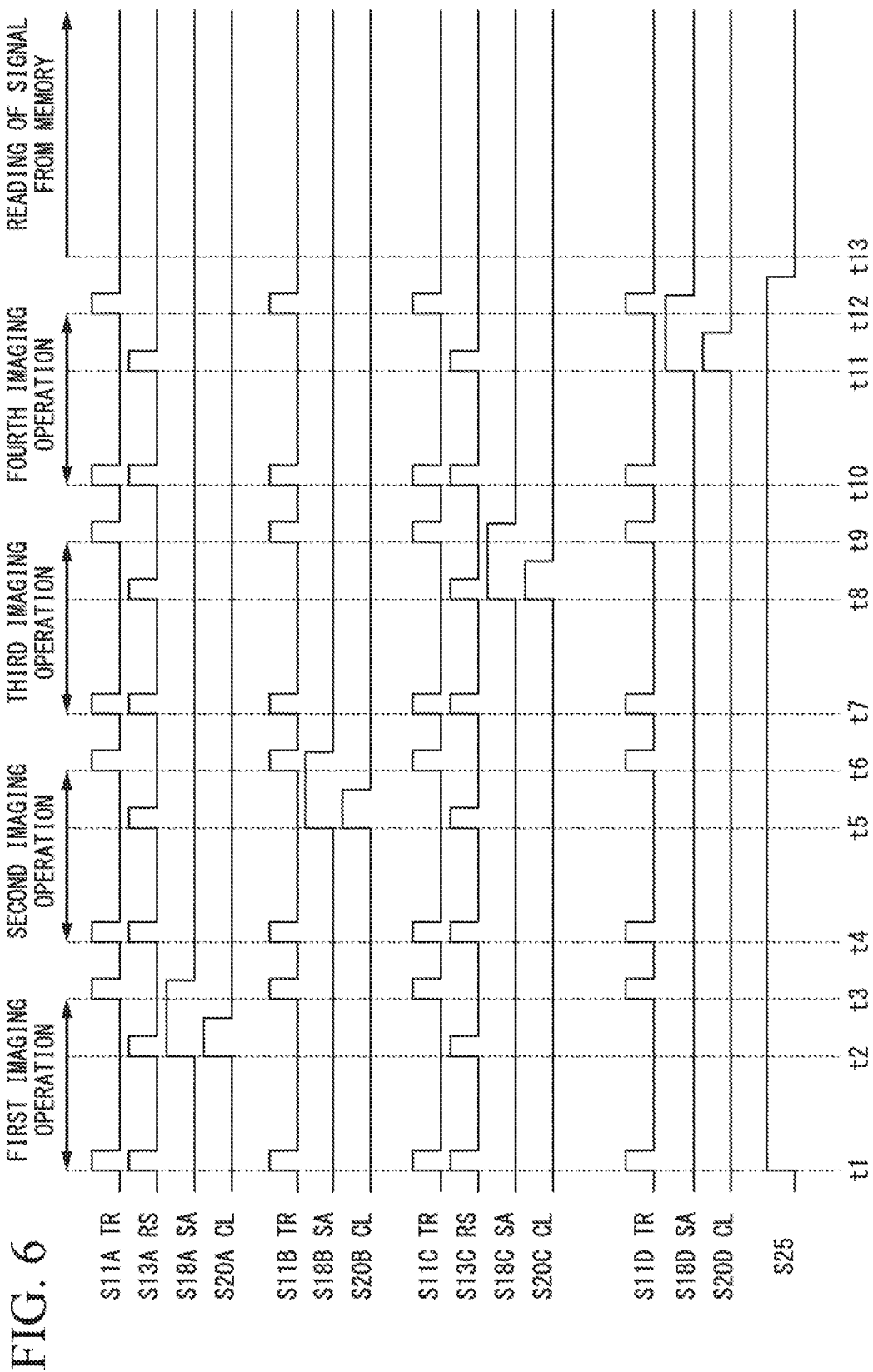
FIG. 6 is a timing chart showing an operation of the solid-state imaging device according to the second embodiment of the present invention.

FIG. 6 shows an operation of the solid-state imaging device 1 according to the second embodiment. In FIG. 6, a waveform of each control signal is shown. In FIG. 6, a horizontal direction shows time and a vertical direction shows a voltage. In FIG. 6, an imaging operation is performed four times. Therefore, an imaging signal of four frames is acquired. Each imaging operation is performed simultaneously in the plurality of pixel group units 101a. In the operation shown in FIG. 6, aspects different from those in the operation shown in FIG. 3 will be described.

Since the reset transistor 13 is shared between the two pixels 100 adjacent in the column direction, the control signal S13B and the control signal S13D are not used. Since the pixel connection transistor 24 is not arranged, the control signal S24 is not used.

For aspects other than the above, the operation shown in FIG. 6 is the same as the operation shown in FIG. 3.

In the operation shown in FIG. 6, the control signal S25 may be controlled, similar to the control signal S25 shown in FIG. 4. In this case, the control signal S18A is controlled, similar to the control signal S18A shown in FIG. 4, the control signal S18B is controlled, similar to the control signal S18B shown in FIG. 4, the control signal S18C is controlled, similar to the control signal S18C shown in FIG. 4, and the control signal S18D is controlled, similar to the control signal S18D shown in FIG. 4.

In the solid-state imaging device 1 of the second embodiment, it is possible to shorten an imaging interval, as in the first embodiment.

In the second embodiment, an area of the plurality of pixels 100 is reduced by sharing some of elements constituting two or more pixels 100.

Third Embodiment

Figure 7:
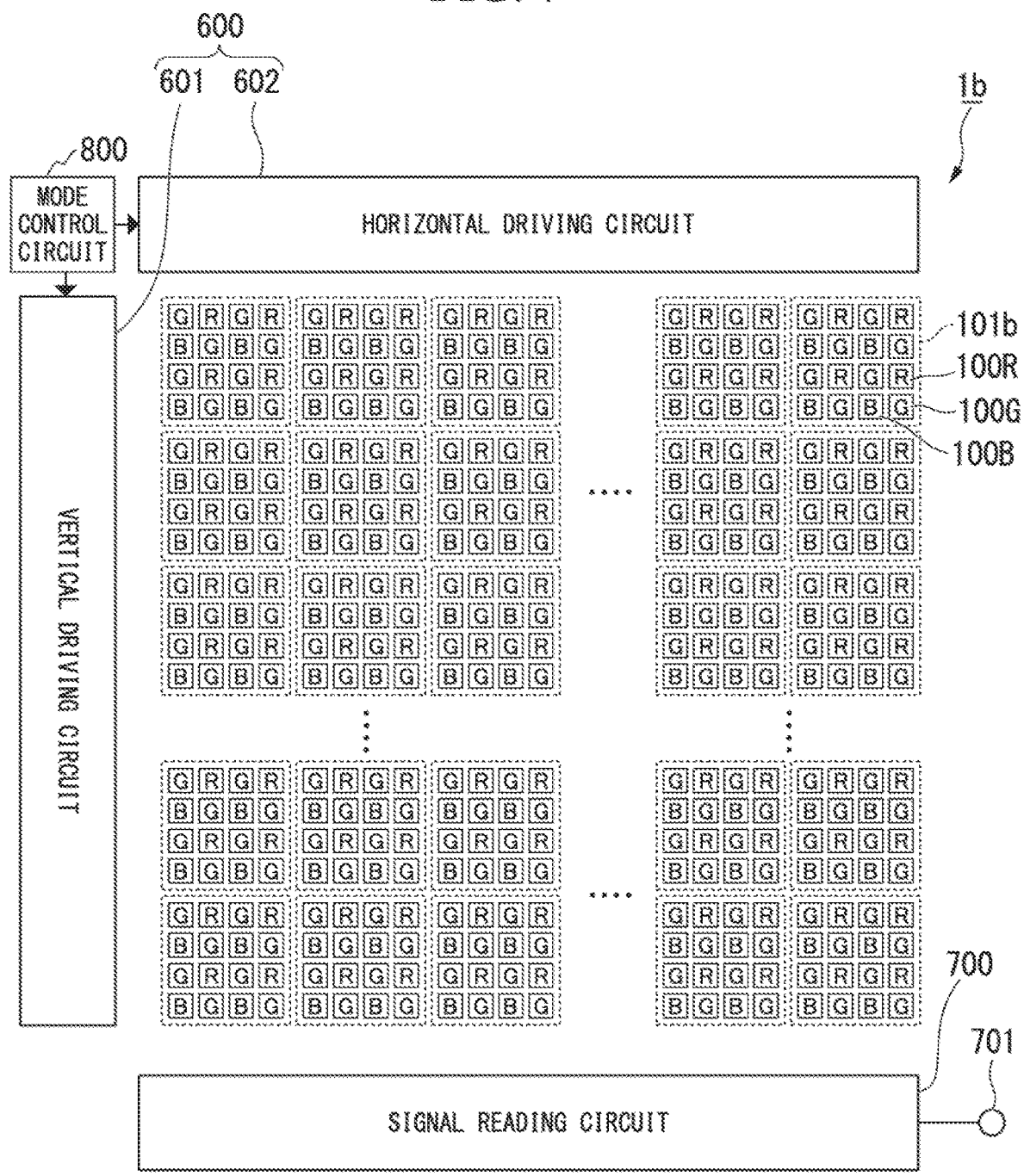
FIG. 7 is a block diagram showing a configuration of a solid-state imaging device according to a third embodiment of the present invention.
Figure 8:
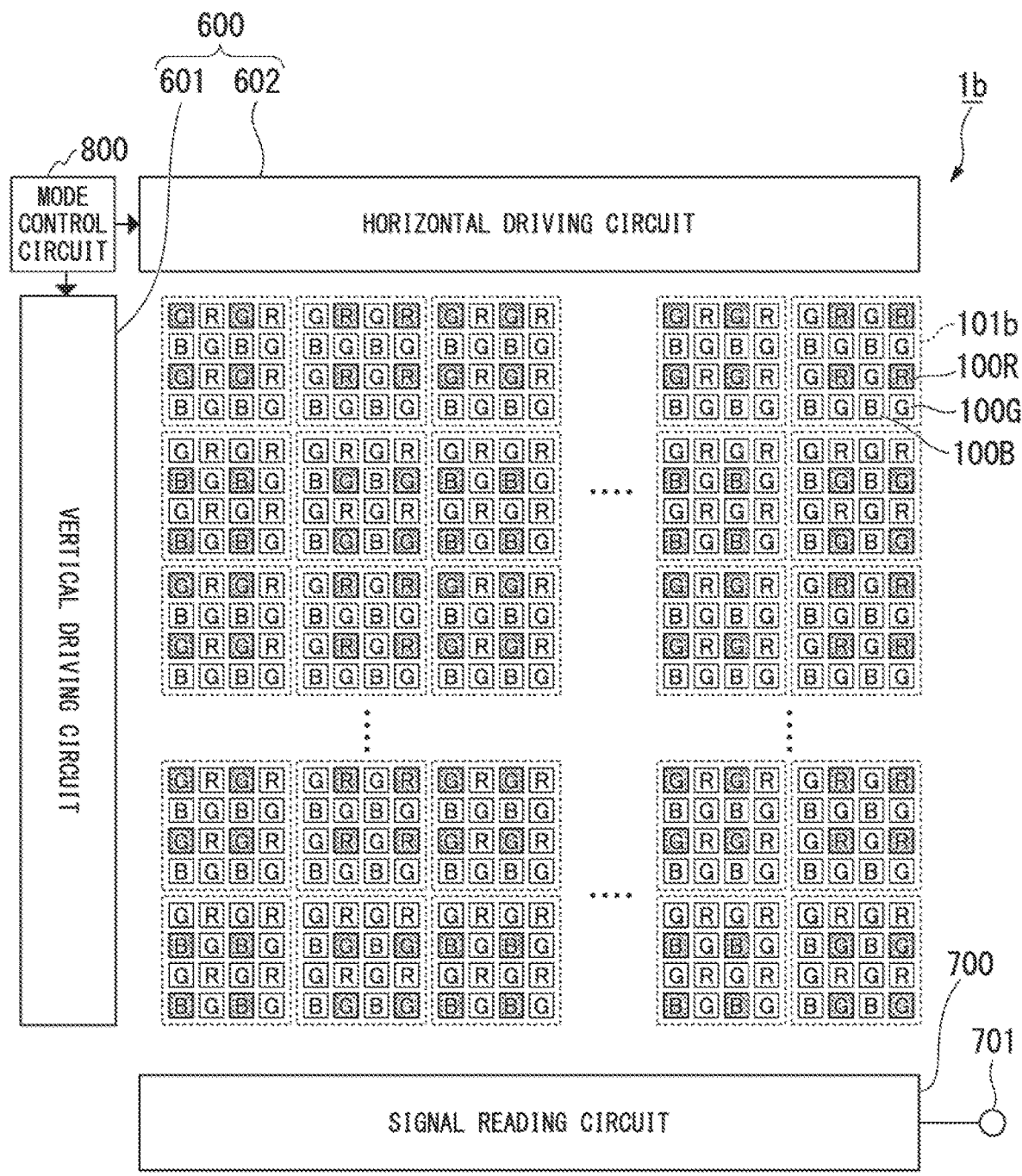
FIG. 8 is a block diagram showing a configuration of a solid-state imaging device according to a third embodiment of the present invention.

In a third embodiment, the solid-state imaging device 1 shown in FIG. 1 is changed to a solid-state imaging device 1b shown in FIGS. 7 and 8. FIGS. 7 and 8 show a configuration of the solid-state imaging device 1b. As shown in FIGS. 7 and 8, the solid-state imaging device 1b includes a plurality of pixels 100R, a plurality of pixels 100G, a plurality of pixels 100B, a pixel control circuit 600, a signal reading circuit 700, and a mode control circuit 800. In the configuration shown in FIGS. 7 and 8, aspects different from the configuration shown in FIG. 1 will be described.

Configurations of the pixel 100R, the pixel 100B, and the pixel 100B are the same. A color filter is arranged on a surface of each pixel. The plurality of pixels 100R correspond to red. A color filter that transmits red light is arranged on the surfaces of the plurality of pixels 100R. The plurality of pixels 100R generates an imaging signal based on the red light. The plurality of pixels 100G correspond to green. A color filter that transmits green light is arranged on the surfaces of the plurality of pixels 100G. The plurality of pixels 100G generate an imaging signal based on the green light. The plurality of pixels 100B correspond to blue. A color filter that transmits blue light is arranged on the surfaces of the plurality of pixels 100B. The plurality of pixels 100B generate imaging signals based on the blue light. The pixel array shown in FIGS. 7 and 8 is a Bayer array. In the Bayer array, a basic array is regularly and periodically arranged in the row direction and the column direction. The basic array includes one pixel 100R, two pixels 100G, and one pixel 100B.

In FIGS. 7 and 8, reference numerals of one pixel 100R, one pixel 100G, and one pixel 100B are indicated as a representative. In FIGS. 7 and 8, some of a plurality of pixels 100R, a plurality of pixels 100G, and a plurality of pixels 100B are omitted. The plurality of pixels 100R, the plurality of pixels 100G, and the plurality of pixels 100B are arranged in a matrix form. The number of pixels in the row direction and the column direction may be 2 or more. Each of the plurality of pixels 100R, the plurality of pixels 100G, and the plurality of pixels 100B is included in any one of the plurality of pixel group units 101b. In FIGS. 7 and 8, a reference numeral of one pixel group unit 101b is indicated as a representative. Each of the plurality of pixel group units 101b includes two or more pixels 100R, two or more pixels 100G, and two or more pixels 100B. The number of pixels included in each of the plurality of pixel group units 101b is the same. Pixels included in each of the plurality of pixel group units 101b are continuous in at least one of the row direction and the column direction. The pixel group unit 101b shown in FIGS. 7 and 8 includes 16 pixels. The 16 pixels are four pixels 100R, eight pixels 100G, and four pixels 100B. The number of pixels in the row direction and the column direction in one pixel group unit 101b is four. A plurality of pixel group units 101b are regularly and periodically arranged in the row direction and the column direction. The number of pixels included in one pixel group unit 101b need not be 16.

The number of pixels included in one pixel group unit 101b is an integer multiple of the number of pixels included in a basic array of the Bayer array, that is, 4. Therefore, in all of the plurality of pixel group units 101b, the number of pixels 100R is the same, the number of pixels 100G is the same, and the number of pixels 100B is the same.

The configuration of each of the pixel 100R, the pixel 100G, and the pixel 100B is the same as that of the pixel 100 shown in FIG. 2. In each of the plurality of pixel group units 101b, two adjacent pixels in the column direction are connected to the pixel connection transistor 24, and two pixels adjacent in the row direction are connected to the pixel connection transistor 25.

The mode control circuit 800 sets any one of a first mode and a second mode in the pixel control circuit 600. The first mode is a mode in which imaging signals output from all of the photoelectric conversion elements 10 included in the plurality of pixel group units 101b are added. The second mode is a mode in which only the imaging signals output from the photoelectric conversion elements 10 for a predetermined color included in the plurality of pixel group units 101b are added. The pixel control circuit 600 controls the plurality of pixels 100R, the plurality of pixels 100G, and the plurality of pixels 100B according to the set mode.

For aspects other than the above, the configuration shown in FIGS. 7 and 8 is the same as the configuration shown in FIG. 1.

In the first mode, the imaging signals output from all of the photoelectric conversion elements 10 included in the plurality of pixel group units 101b are added. In the first mode, the number of pixels that output the imaging signal is larger than the number of pixels that output the imaging signal in the second mode. In the first mode, color information in the imaging signal is lost, but the solid-state imaging device 1b can acquire a monochrome image. In the first mode, the solid-state imaging device 1b can acquire an image having higher resolution than an image acquired in the second mode. The number of imaging signals added in the first mode is larger than the number of imaging signals added in the second mode. Therefore, in the first mode, the solid-state imaging device 1b can acquire an image having a higher S/N than the image acquired in the second mode. For example, when color information is not required for observation of a high-speed phenomenon, the solid-state imaging device 1b is driven in the first mode.

In the second mode, the imaging signals output from the photoelectric conversion elements 10 of enhanced pixels shown in FIG. 8 are added. In the second mode, imaging signals corresponding to only one color are output from pixels included in one pixel group unit 101b. The imaging signals output from the photoelectric conversion elements 10 in the pixels 100G corresponding to green or the pixels 100R corresponding to red are added in the pixel group units 101b arranged in odd rows in the array of the plurality of pixel group units 101b. In the pixel group units 101b arranged in the odd rows in the array of the plurality of pixel group units 101b, only the imaging signals generated by the pixels 100G or 100R are output to the vertical signal line 26. The imaging signals output from the photoelectric conversion elements 10 in the pixels 100B corresponding to the blue or the pixels 100G corresponding to the green are added in the pixel group units 101b arranged in even rows in the array of the plurality of pixel group units 101b. In the pixel group unit 101b arranged in the even rows in the array of the plurality of pixel group units 101b, only the imaging signal generated by the pixel 100B or the pixel 100G is output to the vertical signal line 26.

In the second mode, the pixel group units 101b are arranged according to the same rule as a rule in the Bayer array. In the array of the plurality of pixel group units 101b, basic arrays are regularly and periodically arranged in the row direction and the column direction. The basic array includes one pixel group unit 101b that outputs only an imaging signal corresponding to red, two pixel group units 101b that output only an imaging signal corresponding to green, and one pixel group unit 101b that outputs only an imaging signal corresponding to blue. In the second mode, the solid-state imaging device 1b can acquire a color image.

In the first mode, control of the pixel group unit 101b regarding an imaging operation and an operation of reading the imaging signal is the same as the control of the pixel group unit 101 in the first embodiment. In the second mode, control of the pixel group unit 101b regarding the imaging operation and the operation of reading the imaging signal is changed as follows. In each of the plurality of pixel group units 101b, when the imaging signal is output from the photoelectric conversion element 10, only the transfer transistor 11 in the pixel corresponding to the same color is turned ON. Accordingly, only the imaging signals output from the photoelectric conversion elements 10 corresponding to the same color are added. For aspects other than the above, the control of the pixel group unit 101b regarding the imaging operation and the operation of reading the imaging signal in the second mode is the same as the control of the pixel group unit 101 in the first embodiment.

As described above, the mode control circuit 800 sets one of the first mode and the second mode in the pixel control circuit 600. When the first mode is set a signal obtained by adding the imaging signals output from all of the photoelectric conversion elements 10 included in each of the plurality of pixel group units 101b is transferred to one of two or more memories 19 included in each of the plurality of pixel group units 101b in each of a plurality of imaging operations. When the second mode is set, each of the plurality of pixel group units 101b includes two or more pixels corresponding to first color and two or more pixels corresponding to second color. The first color and the second color are different from each other. When the second mode is set, a signal obtained by adding the imaging signals output from the photoelectric conversion elements 10 included in each of the plurality of pixel group units 101b and corresponding to the same color is transferred to one of the two or more memories 19 included in each of the plurality of pixel group units 101b in each of the plurality of imaging operations.

Each of the first color and the second color is an arbitrary one of a plurality of colors. That is, each of the first color and the second color is arbitrary one of red, green, and blue.

In the solid-state imaging device 1b of the third embodiment, it is possible to shorten an imaging interval, as in the first embodiment.

In the solid-state imaging device 1b of the third embodiment, it is possible to acquire a monochrome image or a color image according to the mode.

Fourth Embodiment

Figure 9:
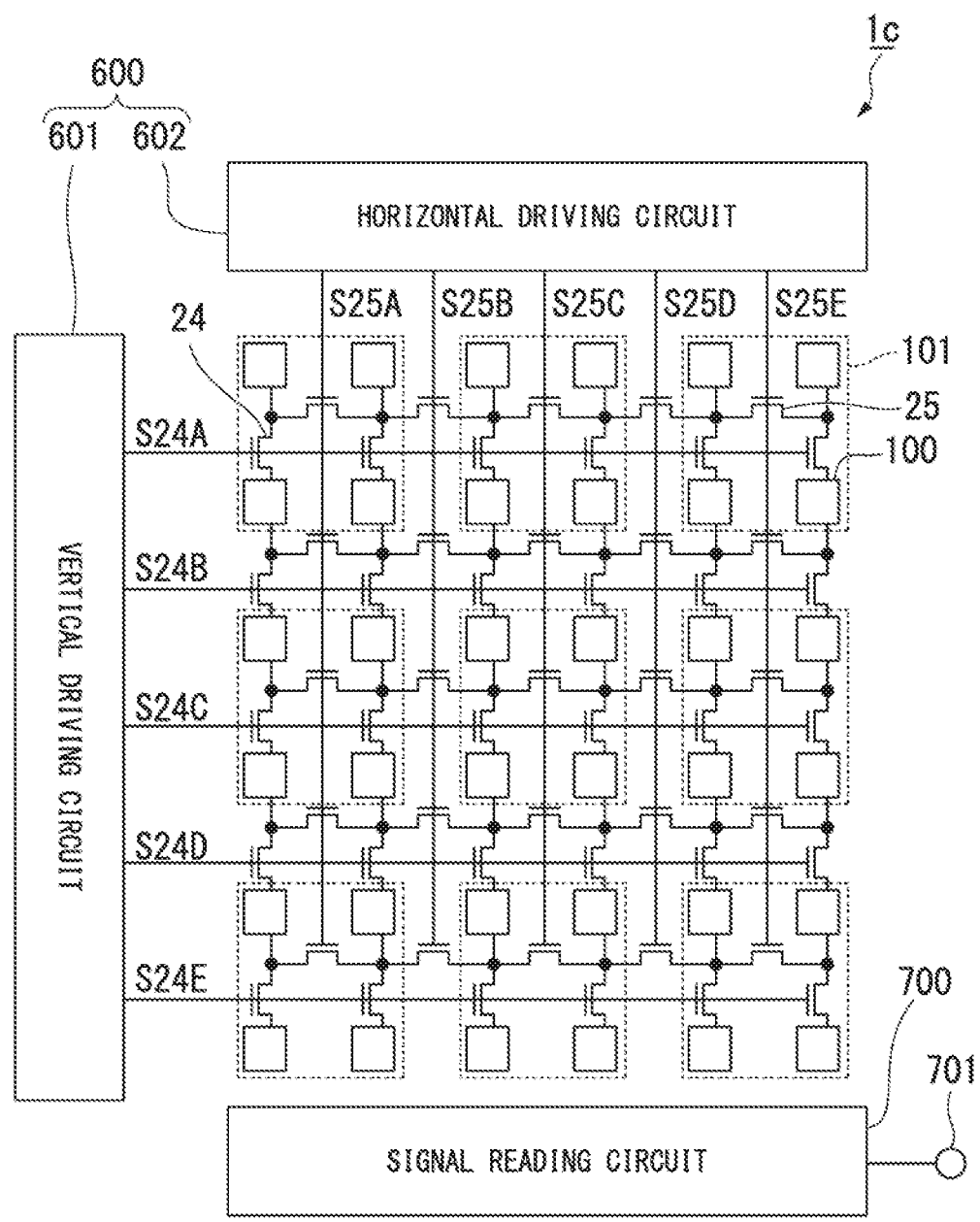
FIG. 9 is a block diagram showing a configuration of a solid-state imaging device according to a fourth embodiment of the present invention.
Figure 10:
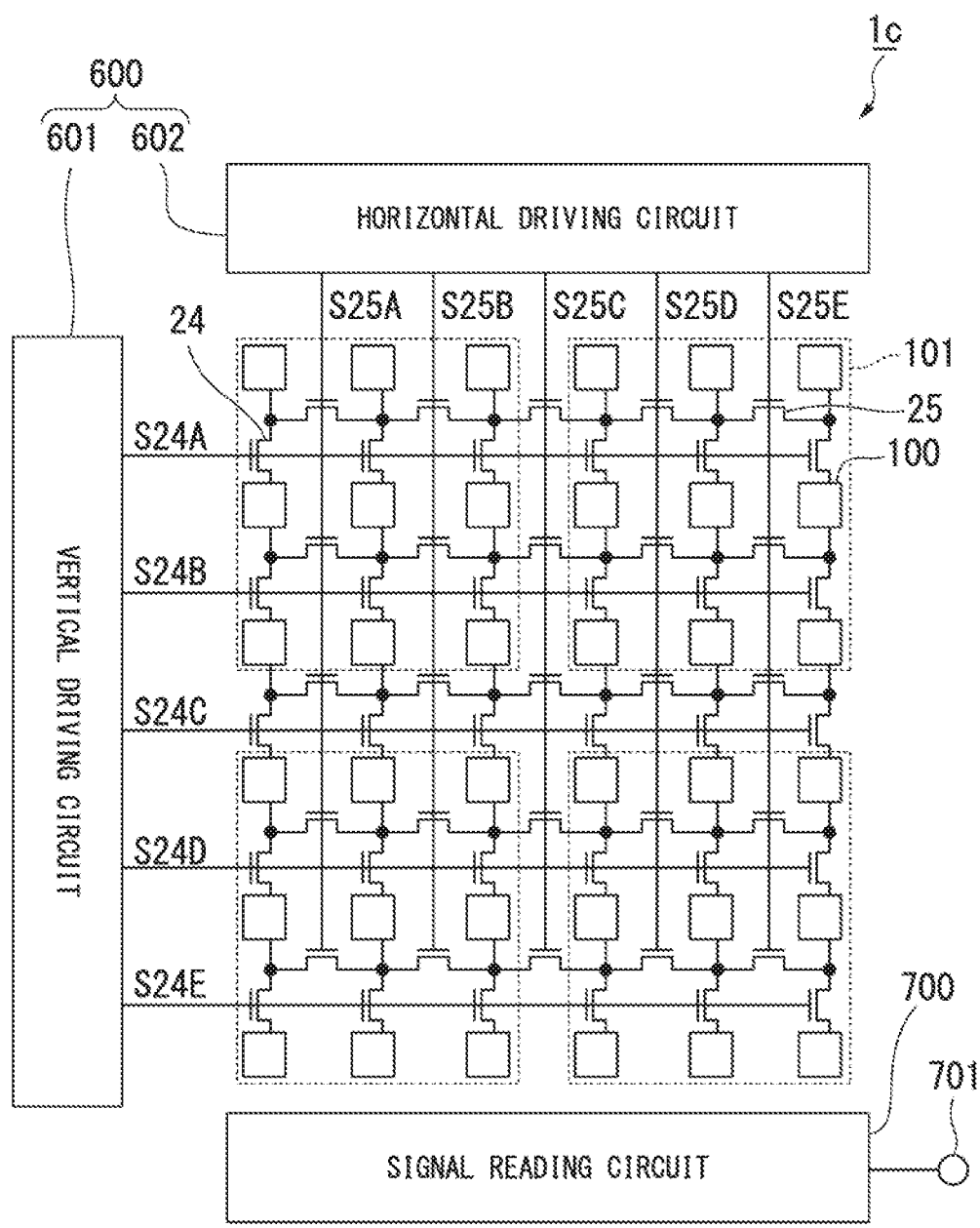
FIG. 10 is a block diagram showing a configuration of a solid-state imaging device according to a fourth embodiment of the present invention.

In a fourth embodiment, the solid-state imaging device 1 shown in FIG. 1 is changed to a solid-state imaging device 1c shown in FIGS. 9 and 10. FIGS. 9 and 10 show a configuration of the solid-state imaging device 1c. In the configuration shown in FIGS. 9 and 10, aspects different from the configuration shown in FIG. 1 will be described.

In FIGS. 9 and 10, a reference numeral of one pixel 100 is indicated as a representative. In FIGS. 9 and 10, a reference numeral of one pixel group unit 101 is indicated as a representative. In FIGS. 9 and 10, reference numerals of one pixel connection transistor 24 and one pixel connection transistor 25 are indicated as a representative.

In FIGS. 9 and 10, 36 pixels 100 are arranged. The number of pixels in a row direction and a column direction is 6. A pixel connection transistor 24 is connected to two adjacent pixels 100 in the column direction. A pixel connection transistor 25 is connected to two adjacent pixels 100 in the row direction.

The pixel connection transistor 24 connected to the pixel 100 of a first row and the pixel 100 of a second row is controlled by a control signal S24A output from a vertical driving circuit 601. The pixel connection transistor 24 connected to the pixel 100 of the second row and the pixel 100 of a third row is controlled by a control signal S24B output from the vertical driving circuit 601. The pixel connection transistor 24 connected to the pixel 100 of the third row and the pixel 100 of a fourth row is controlled by a control signal S24C output from the vertical driving circuit 601. The pixel connection transistor 24 connected to the pixel 100 of the fourth row and the pixel 100 of a fifth row is controlled by a control signal S24D output from the vertical driving circuit 601. The pixel connection transistor 24 connected to the pixel 100 of the fifth row and the pixel 100 of a sixth row is controlled by a control signal S24E output from the vertical driving circuit 601.

The pixel connection transistor 25 connected to the pixel 100 of a first column and the pixel 100 of a second column is controlled by a control signal S25A output from the horizontal driving circuit 602. The pixel connection transistor 25 connected to the pixel 100 of the second column and the pixel 100 of a third column is controlled by a control signal S25B output from the horizontal driving circuit 602. The pixel connection transistor 25 connected to the pixel 100 of the third column and the pixel 100 of a fourth column is controlled by a control signal S25C output from the horizontal driving circuit 602. The pixel connection transistor 25 connected to the pixel 100 of the fourth row and the pixel 100 of a fifth row is controlled by a control signal S25D output from the horizontal driving circuit 602. The pixel connection transistor 25 connected to the pixel 100 of the fifth row and the pixel 100 of a sixth column is controlled by a control signal S25E output from the horizontal driving circuit 602.

The pixel control circuit 600 controls the number of pixels 100 included in each of the plurality of pixel group units 101. Specifically, the pixel control circuit 600 controls the pixel connection transistor 24 and the pixel connection transistor 25 according to each control signal.

In FIG. 9, the pixel connection transistor 24 to which the control signal S24A, the control signal S24C, and the control signal S24E are supplied is ON. The pixel connection transistor 24 to which the control signal S24B and the control signal S24D are supplied is OFF. The pixel connection transistor 25 to which the control signal S25A, the control signal S25C, and the control signal S25E are supplied is ON. The pixel connection transistor 25 to which the control signal S25B and the control signal S25D are supplied is OFF. Accordingly, the FDs 12 in the four pixels 100 are electrically connected to each other, and the four pixels 100 are included in one pixel group unit 101.

In FIG. 10, the pixel connection transistor 24 to which the control signal S24A, the control signal S24B, the control signal S24D, and the control signal S24E are supplied is ON. The pixel connection transistor 24 to which the control signal S24C is supplied is OFF. The pixel connection transistor 25 to which the control signal S25A, the control signal S25B, the control signal S25D, and the control signal S25E are supplied is ON. The pixel connection transistor 25 to which the control signal S25C is supplied is OFF. Accordingly, the FDs 12 in the nine pixels 100 are electrically connected to each other, and the nine pixels 100 are included in one pixel group unit 101.

As described above, the pixel control circuit 600 controls the pixel connection transistor 24 and the pixel connection transistor 25 to control the number of the pixels 100 included in each of the plurality of pixel group units 101. In FIG. 9, nine pixel group units 101 are arranged. In FIG. 10, four pixel group units 101 are arranged. That is, the pixel control circuit 600 controls the number of the plurality of pixel group units 101.

The number of imaging times is changed according to the number of pixels 100 included in each of the plurality of pixel group units 101. When the pixel group units 101 shown in FIG. 9 are arranged, each of the plurality of pixel group units 101 includes four pixels 100. Therefore, the solid-state imaging device 1c can perform the imaging operation four times. That is, the solid-state imaging device 1c can acquire an imaging signal of four frames. When the pixel group units 101 shown in FIG. 10 are arranged, each of the plurality of pixel group units 101 includes nine pixels 100. Therefore, the solid-state imaging device 1c can perform the imaging operation nine times. That is, the solid-state imaging device 1c can acquire an imaging signal of nine frames.

The number of image signals to be added is changed according to the number of pixels 100 included in each of the plurality of pixel group units 101. When the pixel group units 101 shown in FIG. 9 is arranged, each of the plurality of pixel group units 101 includes four pixels 100. Therefore, four imaging signals are added in each of the plurality of pixel group units 101. When the pixel group units 101 shown in FIG. 10 is arranged, each of the plurality of pixel group units 101 includes nine pixels 100. Therefore, nine imaging signals are added in each of the plurality of pixel group units 101. By increasing the number of imaging signals to be added, S/N of the imaging signal is further improved.

In the solid-state imaging device 1c of the fourth embodiment, it is possible to shorten the imaging interval, as in the first embodiment.

In the solid-state imaging device 1c of the fourth embodiment, it is possible to control the number of acquired image signals (number of frames).

Fifth Embodiment

Figure 11:
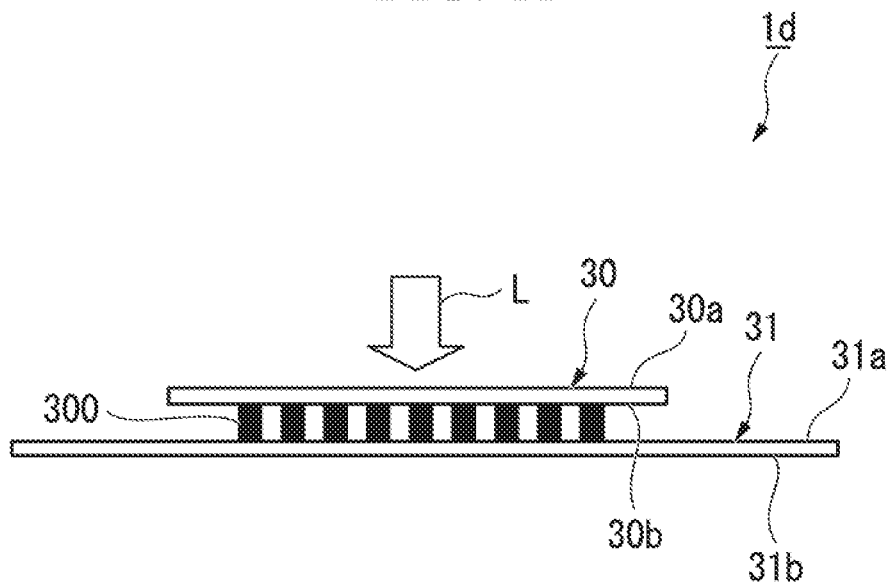
FIG. 11 is a cross-sectional view of a solid-state imaging device according to a fifth embodiment of the present invention.

FIG. 11 shows a configuration of a solid-state imaging device 1d according to a fifth embodiment of the present invention. The solid-state imaging device 1d includes a first substrate 30 and a second substrate 31. A photoelectric conversion element 10 is arranged on the first substrate 30. A memory 19 is arranged on the second substrate 31.

The first substrate 30 and the second substrate 31 are laminated. The first substrate 30 and the second substrate 31 are electrically connected to each other so that electric signals are transferred between the two substrates. The first substrate 30 has a surface 30a and a surface 30b. The surfaces 30a and 30b constitute a main surface of the first substrate 30. The main surface is a surface having a relatively larger surface area than a side surface among surfaces constituting the substrate. The second substrate 31 has a surface 31a and a surface 31b. The surface 31a and the surface 31b constitute a main surface of the second substrate 31. The surface 30b of the first substrate 30 and the surface 31a of the second substrate 31 face each other.

The solid-state imaging device 1d further includes a connection portion 300. The connecting portion 300 is arranged between the first substrate 30 and the second substrate 31. The connecting portion 300 is electrically connected to the first substrate 30 and the second substrate 31.

The surface 30a of the first substrate 30 is irradiated with light L. The light L with which the first substrate 30 has been irradiated is incident on the photoelectric conversion element 10. An imaging signal output from the photoelectric conversion element 10 arranged on the first substrate 30 is output to the second substrate 31 via the connection portion 300. The imaging signal output to the second substrate 31 is held in the memory 19. In the example shown in FIG. 11, an area of the main surface of the first substrate 30 and an area of the main surface of the second substrate 31 are different from each other, but the area of the main surface of the first substrate 30 and the area of the main surface of the second substrate 31 may be the same as each other.

Each of the elements constituting the pixel 100 is arranged on one of the first substrate 30 and the second substrate 31. The elements other than the photoelectric conversion element 10 and the memory 19 among the elements constituting the pixel 100 may be arranged only on one of the first substrate 30 and the second substrate 31. The pixel 100 may include a first element arranged on the first substrate 30 and a second element arranged on the second substrate 31. Each of the first element and the second element of the pixel 100 is an arbitrary element other than the photoelectric conversion element 10 and the memory 19.

Each of the elements constituting the signal transfer circuit is arranged on one of the first substrate 30 and the second substrate 31. The signal transfer circuit may be arranged on only one of the first substrate 30 and the second substrate 31. The signal transfer circuit may include a first element arranged on the first substrate 30 and a second element arranged on the second substrate 31. Each of the first element and the second element of the signal transfer circuit includes any one of the transfer transistor 11, the FD 12, the first amplification transistor 14, the first current source 15, the clamp capacitor 16, and the sample-and-hold transistor 18.

Each of the elements constituting the signal output circuit is arranged on one of the first substrate 30 and the second substrate 31. The signal output circuit may be arranged on only one of the first substrate 30 and the second substrate 31. The signal output circuit may include a first element arranged on the first substrate 30 and a second element arranged on the second substrate 31. Each of the first element and the second element of the signal output circuit is any one of the second amplification transistor 21 and the selection transistor 22.

Each of the elements constituting the memory output circuit is arranged on one of the first substrate 30 and the second substrate 31. The memory output circuit may be arranged on only one of the first substrate 30 and the second substrate 31. The memory output circuit may include a first element arranged on the first substrate 30 and a second element arranged on the second substrate 31. Each of the first element and the second element of the memory output circuit is any one of the first amplification transistor 14, the first current source 15, and the clamp capacitor 16.

Each of the elements constituting the pixel control circuit 600 is arranged in one of the first substrate 30 and the second substrate 31. The pixel control circuit 600 may be arranged on only one of the first substrate 30 and the second substrate 31. The pixel control circuit 600 may include a first element arranged on the first substrate 30 and a second element arranged on the second substrate 31. For example, each of the first element of the pixel control circuit 600 and the second element of the pixel control circuit 600 is any one of the vertical driving circuit 601 and the horizontal driving circuit 602. Each of the first element and the second element of the pixel control circuit 600 may be an arbitrary element of the vertical driving circuit 601 or an arbitrary element of the horizontal driving circuit 602.

Each of the elements constituting the signal reading circuit 700 is arranged on one of the first substrate 30 and the second substrate 31. The signal reading circuit 700 may be arranged on only one of the first substrate 30 and the second substrate 31. The signal reading circuit 700 may include a first element arranged on the first substrate 30 and a second element arranged on the second substrate 31.

Each of the elements constituting the mode control circuit 800 is arranged on one of the first substrate 30 and the second substrate 31. The mode control circuit 800 may be arranged on only one of the first substrate 30 and the second substrate 31. The mode control circuit 800 may include a first element arranged on the first substrate 30 and a second element arranged on the second substrate 31.

The pixel connection transistor 24 and the pixel connection transistor 25 are arranged on at least one of the first substrate 30 and the second substrate 31.

Figure 12:
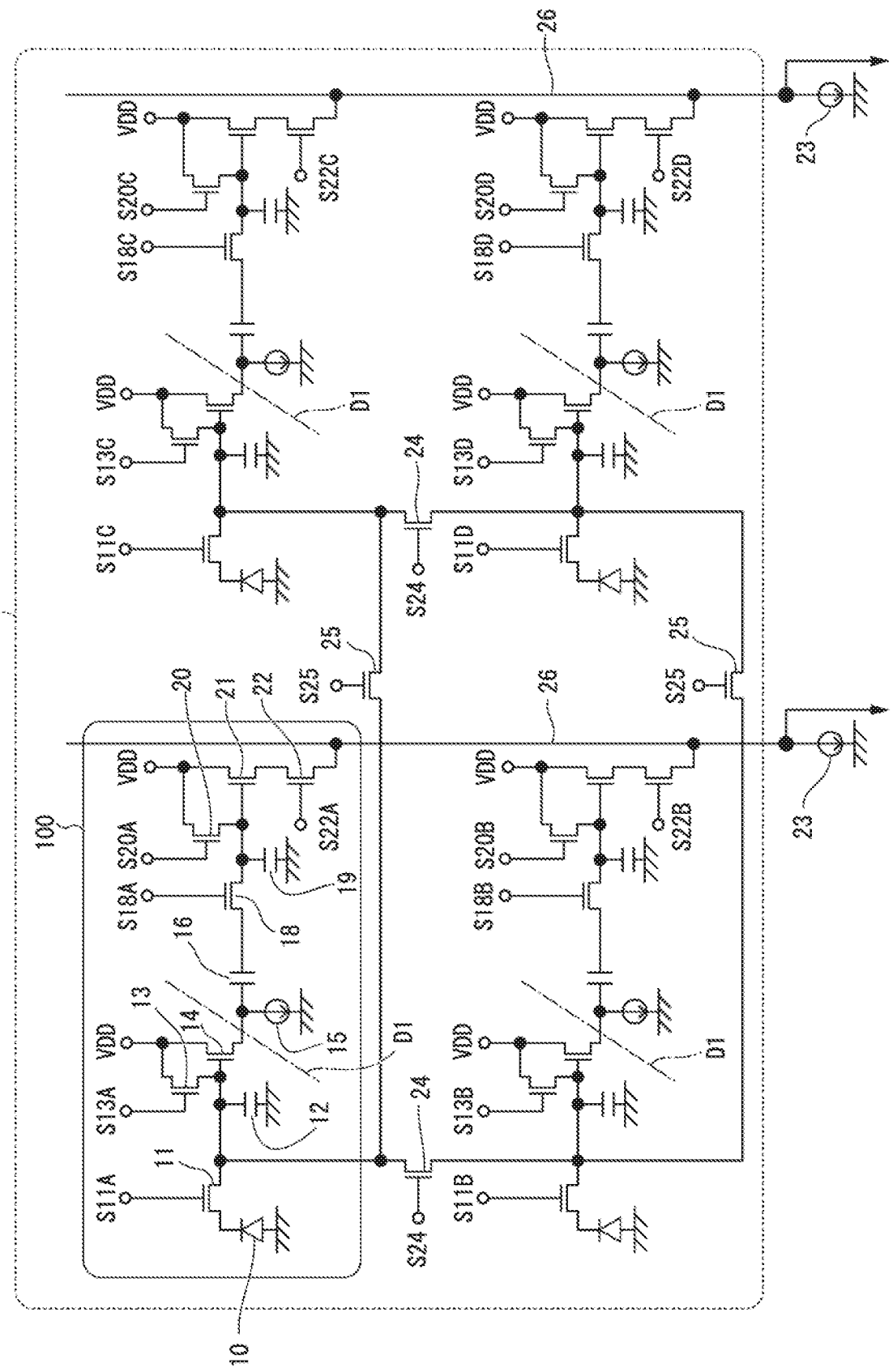
FIG. 12 is a circuit diagram of a pixel group unit in a solid-state imaging device according to a fifth embodiment of the present invention.

FIG. 12 shows a configuration of the pixel group unit 101. The configuration shown in FIG. 12 is the same as the configuration shown in FIG. 2. Therefore, a description of the configuration shown in FIG. 12 is omitted.

In FIG. 12, a boundary between the first substrate 30 and the second substrate 31 is schematically indicated by a line D1. In FIG. 12, there is a boundary between the first substrate 30 and the second substrate 31 between the first amplification transistor 14 and the first current source 15. That is, in a transmission path for the imaging signal, the connection portion 300 is arranged between the first amplification transistor 14 and the first current source 15. The photoelectric conversion element 10, the transfer transistor 11, the floating diffusion 12, the reset transistor 13, and the first amplification transistor 14 are arranged on the first substrate 30. The first current source 15, the clamp capacitor 16, the sample-and-hold transistor 18, the memory 19, the clamp transistor 20, the second amplification transistor 21, and the selection transistor 22 are arranged on the second substrate 31. The second current source 23 and the vertical signal line 26 are arranged on the second substrate 31. The pixel connection transistor 24 and the pixel connection transistor 25 are arranged on the first substrate 30.

The elements arranged on the first substrate 30 and the second substrate 31 are not limited to the above example.

In the solid-state imaging device 1d of the fifth embodiment, it is possible to shorten an imaging interval, as in the first embodiment.

In the fifth embodiment, the photoelectric conversion element 10 and the memory 19 are arranged on different substrates. Therefore, an area occupied by the photoelectric conversion element 10 can be further increased. Light incident on the second substrate 31 is shielded by the first substrate 30. Therefore, it is difficult for light to be incident on the memory 19. Therefore, S/N of the imaging signal held in the memory 19 is improved.

Sixth Embodiment

Figure 13:
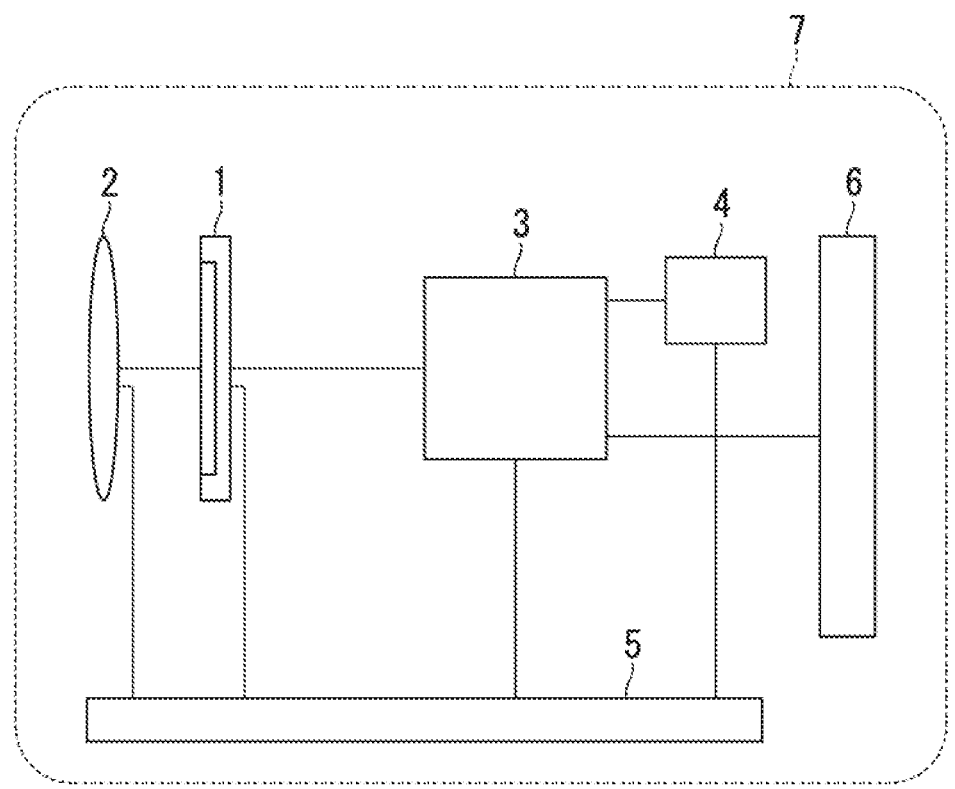
FIG. 13 is a block diagram showing a configuration of an imaging apparatus according to a sixth embodiment of the present invention.

FIG. 13 shows a configuration of an imaging apparatus 7 according to a sixth embodiment of the present invention. The imaging apparatus 7 may be any electronic device having an imaging function. For example, the imaging apparatus 7 is one of a digital camera, a digital video camera, a surveillance camera, an endoscope, and a microscope. As shown in FIG. 13, the imaging apparatus 7 includes a solid-state imaging device 1, a lens unit portion 2, an image signal processing device 3, a recording device 4, a camera control device 5, and a display device 6.

The solid-state imaging device 1 is the solid-state imaging device 1 of the first embodiment. The lens unit portion 2 includes a zoom lens and a focus lens. The lens unit portion 2 forms a subject image based on the light from a subject on a light reception surface of the solid-state imaging device 1. The light taken through the lens unit portion 2 is focused on the light reception surface of the solid-state imaging device 1. The solid-state imaging device 1 converts a subject image formed on the light reception surface into an imaging signal, and outputs the imaging signal.

The image signal processing device 3 performs a predetermined process on the imaging signal output from the solid-state imaging device 1. The process performed by the image signal processing device 3 includes conversion to image data, various corrections of the image data, compression of image data, and the like.

The recording device 4 includes, for example, a semiconductor memory for performing recording or reading of image data. The recording device 4 can be attached to and detached from the imaging apparatus 7. The display device 6 displays an image based on the image data processed by the image signal processing device 3 or the image data read from the recording device 4.

The camera control device 5 performs control of the entire imaging apparatus 7. An operation of the camera control device 5 is defined in a program stored in a ROM built into the imaging apparatus 7. The camera control device 5 reads this program and performs various controls according to the content defined by the program.

The solid-state imaging device 1 may be any one of the solid-state imaging devices of the second to fifth embodiments.

As described above, the imaging apparatus 7 includes the solid-state imaging device 1. The imaging apparatus of each aspect of the present invention need not have a configuration corresponding to at least one of the lens unit portion 2, the image signal processing device 3, the recording device 4, the camera control device 5, and the display device 6.

In the solid-state imaging device 1 of the sixth embodiment, it is possible to shorten the imaging interval, as in the first embodiment. Therefore, in the imaging apparatus 7 to which the solid-state imaging device 1 has been applied, it is possible to shorten the imaging interval.

While preferred embodiments of the invention have been described and shown above, it should be understood that these are exemplars of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A solid-state imaging device, comprising:
a plurality of pixels; and
a pixel control circuit,
wherein each of the plurality of pixels includes
a photoelectric conversion element configured to perform imaging and output charge as an imaging signal;
a memory configured to hold the imaging signal;
a signal transfer circuit configured to transfer the imaging signal output from the photoelectric conversion element to the memory; and
a signal output circuit configured to output the imaging signal held in the memory to a signal line,
the signal transfer circuit includes
a floating diffusion configured to hold a voltage based on the charge output from the photoelectric conversion element;
a transfer transistor configured to transfer the charge output from the photoelectric conversion element to the floating diffusion;
a memory output circuit configured to output the imaging signal based on the voltage held in the floating diffusion to the memory; and
a first connection transistor connected to the memory output circuit and the memory, the first connection transistor configured to switch between a state in which the memory output circuit and the memory are electrically connected to each other and a state in which the memory output circuit and the memory are electrically isolated from each other,
each of the plurality of pixels is included in any one of a plurality of pixel group units,
each of the plurality of pixel group units includes two or more of the pixels,
the solid-state imaging device further includes a second connection transistor connected to two or more floating diffusions included in each of the plurality of pixel group units, the second connection transistor configured to switch between a state in which the two or more floating diffusions are electrically connected to each other and a state in which the two or more floating diffusions are electrically isolated from each other,
the pixel control circuit controls the signal transfer circuit so that an imaging operation is performed simultaneously in the plurality of pixel group units and a plurality of imaging operations are performed in each of the plurality of pixel group units,
the pixel control circuit is configured to electrically connect the memory output circuit and the memory to each other using the first connection transistor, and electrically connect the two or more floating diffusions using the second connection transistor when the imaging signals output from the photoelectric conversion elements are added,
the pixel control circuit is configured to transfer the charge output from the photoelectric conversion element to the floating diffusion using the transfer transistor after the memory output circuit and the memory are electrically connected to each other and the two or more floating diffusions are electrically connected to each other,
an added signal obtained by adding the imaging signals output from the predetermined two or more photoelectric conversion elements included in each of the plurality of pixel group units is transferred to one of the two or more memories included in each of the plurality of pixel group units in each of the plurality of imaging operations,
each of the two or more memories included in each of the plurality of pixel group units is configured to hold the added signal in a predetermined order, and
at least one of the added signals held in the memory in each of the plurality of imaging operations is output to the signal line in a period in which any one of the plurality of imaging operations is performed or in a period after the plurality of imaging operations have ended.

2. The solid-state imaging device according to claim 1, wherein the pixel control circuit further controls the number of the pixels included in each of the plurality of pixel group units.

3. The solid-state imaging device according to claim 1, wherein the added signal obtained by adding the imaging signals output from all of the photoelectric conversion elements included in each of the plurality of pixel group units is transferred to one of the two or more memories included in each of the plurality of pixel group units in each of the plurality of imaging operations.

4. The solid-state imaging device according to claim 1, wherein each of the plurality of pixel group units includes two or more pixels corresponding to a first color and two or more pixels corresponding to a second color, the first color and the second color being different from each other, and
the added signal obtained by adding the imaging signals output from the photoelectric conversion elements included in each of the plurality of pixel group units and corresponding to the same color is transferred to one of two or more memories included in each of the plurality of pixel group units in each of the plurality of imaging operations.

5. The solid-state imaging device according to claim 1, further comprising a mode control circuit configured to set one of a first mode and a second mode in the pixel control circuit, wherein when the first mode is set, the added signal obtained by adding the imaging signals output from all of the photoelectric conversion elements included in each of the plurality of pixel group units is transferred to one of the two or more memories included in each of the plurality of pixel group units in each of the plurality of imaging operations, when the second mode is set, each of the plurality of pixel group units includes two or more pixels corresponding to a first color and two or more pixels corresponding to a second color, the first color and the second color being different from each other, and when the second mode is set, the added signal obtained by adding the imaging signals output from the photoelectric conversion elements included in each of the plurality of pixel group units and corresponding to the same color is transferred to one of two or more memories included in each of the plurality of pixel group units in each of the plurality of imaging operations.

6. The solid-state imaging device according to claim 1, further comprising:
a first substrate and
a second substrate,
wherein the photoelectric conversion element is arranged on the first substrate, and
the memory is arranged on the second substrate.

7. An imaging apparatus, comprising the solid-state imaging device according to claim 1.

8. A solid-state imaging device, comprising:
a plurality of pixels; and
a pixel control circuit,
wherein each of the plurality of pixels includes
a photoelectric conversion element configured to perform imaging and output charge as an imaging signal;
a memory configured to hold the imaging signal;
a signal transfer circuit configured to transfer the imaging signal output from the photoelectric conversion element to the memory; and
a signal output circuit configured to output the imaging signal held in the memory to a signal line,
the signal transfer circuit includes
a floating diffusion configured to hold a voltage based on the charge output from the photoelectric conversion element;
a transfer transistor configured to transfer the charge output from the photoelectric conversion element to the floating diffusion;
a memory output circuit configured to output the imaging signal based on the voltage held in the floating diffusion to the memory; and
a first connection transistor connected to the memory output circuit and the memory, the first connection transistor configured to switch between a state in which the memory output circuit and the memory are electrically connected to each other and a state in which the memory output circuit and the memory are electrically isolated from each other, each of the plurality of pixels is included in any one of a plurality of pixel group units, each of the plurality of pixel group units includes two or more of the pixels, the solid-state imaging device further includes a second connection transistor connected to two or more floating diffusions included in each of the plurality of pixel group units, the second connection transistor configured to switch between a state in which the two or more floating diffusions are electrically connected to each other and a state in which the two or more floating diffusions are electrically isolated from each other, the pixel control circuit controls the signal transfer circuit so that an imaging operation is performed simultaneously in the plurality of pixel group units and a plurality of imaging operations are performed in each of the plurality of pixel group units, the pixel control circuit is configured to electrically connect the memory output circuit and the memory to each other using the first connection transistor when the imaging signals output from the photoelectric conversion elements are added, the pixel control circuit is configured to transfer the charge output from the photoelectric conversion element to the floating diffusion using the transfer transistor after the memory output circuit and the memory are electrically connected to each other, the pixel control circuit is configured to electrically connect the two or more floating diffusions using the second connection transistor after the charge output from the photoelectric conversion element is transferred to the floating diffusion, an added signal obtained by adding the imaging signals output from the predetermined two or more photoelectric conversion elements included in each of the plurality of pixel group units is transferred to one of the two or more memories included in each of the plurality of pixel group units in each of the plurality of imaging operations, each of the two or more memories included in each of the plurality of pixel group units is configured to hold the added signal in a predetermined order, and at least one of the added signals held in the memory in each of the plurality of imaging operations is output to the signal line in a period in which any one of the plurality of imaging operations is performed or in a period after the plurality of imaging operations have ended.

* * * * *